United States Patent
Yamaguchi et al.

(10) Patent No.: US 10,283,075 B2
(45) Date of Patent: May 7, 2019

(54) ELECTRONIC APPARATUS WHICH EFFECTS TOUCH COORDINATE BASED ON PROXIMITY AND STRAIN

(71) Applicant: PANASONIC INTELLECTUAL PROPERTY MANAGEMENT CO., LTD., Osaka (JP)

(72) Inventors: Takeshi Yamaguchi, Kanagawa (JP); Tomoki Takano, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/643,251

(22) Filed: Mar. 10, 2015

(65) Prior Publication Data

US 2015/0370386 A1 Dec. 24, 2015

(30) Foreign Application Priority Data

Jun. 20, 2014 (JP) .................................. 2014-127381

(51) Int. Cl.
G06F 3/041 (2006.01)
G06F 3/044 (2006.01)
G09G 5/00 (2006.01)

(52) U.S. Cl.
CPC .............. *G09G 5/003* (2013.01); *G06F 3/044* (2013.01); *G06F 3/0414* (2013.01);
(Continued)

(58) Field of Classification Search
CPC ........ G06F 3/047; G06F 3/0414; G06F 3/044; G06F 2203/04101; G06F 2203/04105;
(Continued)

(56) References Cited

U.S. PATENT DOCUMENTS 6,492,979 B1 12/2002 Kent et al.
7,061,475 B2 * 6/2006 Kent .................... G06F 3/0418
178/18.01

(Continued)

FOREIGN PATENT DOCUMENTS

EP 2804088 11/2014
JP 6-044254 2/1994
(Continued)

OTHER PUBLICATIONS

U.S. Appl. No. 14/643,300 to Takeshi Yamaguchi et al., filed Mar. 10, 2015.
(Continued)

*Primary Examiner* — Temesghen Ghebretinsae
*Assistant Examiner* — Ivelisse Martinez Quiles
(74) *Attorney, Agent, or Firm* — Greenblum & Bernstein, P.L.C.

(57) ABSTRACT

A strain quantity obtaining unit is provided that obtains a strain quantity at an interval faster than variation in the strain to be detected and stores the maximum value of the strain quantity. When a touch coordinate is obtained at a predetermined sampling interval, if the maximum value of the strain quantity when the touch coordinate is obtained does not exceed a strain quantity threshold value, the touch coordinate is not caused to be effective. However, if the maximum value of the strain quantity when the touch coordinate is obtained exceeds a strain quantity threshold value, the touch coordinate is caused to be effective. If a touch coordinate is caused to be effective once, the touch coordinate is caused to be effective continuously until an instructing object is separated from an operation surface of a touch panel unit at a predetermined distance or more in a perpendicular direction.

13 Claims, 21 Drawing Sheets

(52) U.S. Cl.
CPC .......... *G06F 3/0416* (2013.01); *G06F 3/0418* (2013.01); *G06F 2203/04105* (2013.01); *G06F 2203/04108* (2013.01); *G09G 2300/0426* (2013.01)

(58) Field of Classification Search
CPC ................. G06F 3/0418; G06F 3/0416; G06F 2203/04108; G09G 5/003; G09G 2300/0426

See application file for complete search history.

(56) References Cited

U.S. PATENT DOCUMENTS

| | | | |
|---|---|---|---|
| 2006/0244733 A1 | 11/2006 | Geaghan | |
| 2006/0279548 A1* | 12/2006 | Geaghan | G06F 3/0416 345/173 |
| 2007/0080953 A1 | 4/2007 | Lii | |
| 2008/0062151 A1 | 3/2008 | Kent | |
| 2009/0065267 A1 | 3/2009 | Sato | |
| 2011/0050629 A1* | 3/2011 | Homma | G06F 3/0414 345/174 |
| 2011/0175845 A1* | 7/2011 | Honda | G06F 3/044 345/174 |
| 2011/0248948 A1 | 10/2011 | Griffin et al. | |
| 2012/0023459 A1 | 1/2012 | Westerman | |
| 2012/0044172 A1 | 2/2012 | Ohki et al. | |
| 2012/0056848 A1* | 3/2012 | Yamano | G06F 3/0236 345/174 |
| 2012/0079039 A1 | 3/2012 | Imai | |
| 2012/0086669 A1* | 4/2012 | Kim | G06F 3/0412 345/174 |
| 2012/0105481 A1 | 5/2012 | Baek et al. | |
| 2012/0194446 A1 | 8/2012 | Lin et al. | |
| 2013/0172052 A1* | 7/2013 | Bengtsson | G06F 3/041 455/566 |
| 2013/0201160 A1 | 8/2013 | Ito et al. | |
| 2013/0285956 A1 | 10/2013 | Kamii et al. | |
| 2014/0028575 A1* | 1/2014 | Parivar | G06F 3/0414 345/173 |
| 2014/0168139 A1* | 6/2014 | Ku | G09G 3/20 345/174 |
| 2014/0176458 A1 | 6/2014 | Matsuda | |
| 2014/0204059 A1 | 7/2014 | Geaghan | |
| 2014/0340338 A1 | 11/2014 | Kim et al. | |
| 2015/0042603 A1* | 2/2015 | Takano | G06F 3/0414 345/174 |
| 2015/0109218 A1 | 4/2015 | Satou | |
| 2015/0277661 A1 | 10/2015 | Morinaga et al. | |
| 2015/0331517 A1* | 11/2015 | Filiz | G06F 3/0414 345/173 |
| 2015/0370385 A1 | 12/2015 | Yamaguchi et al. | |
| 2015/0370387 A1 | 12/2015 | Yamaguchi et al. | |
| 2015/0371608 A1 | 12/2015 | Yamaguchi et al. | |

FOREIGN PATENT DOCUMENTS

| | | |
|---|---|---|
| JP | 2004-534974 | 11/2004 |
| JP | 2006-323457 | 11/2006 |
| JP | 2009-087311 | 4/2009 |
| JP | 2009-181232 | 8/2009 |
| JP | 2010-108255 | 5/2010 |
| JP | 2010-108490 | 5/2010 |
| JP | 2011-053971 | 3/2011 |
| JP | 2011-154431 | 8/2011 |
| JP | 2012-043267 | 3/2012 |
| JP | 2012-069002 | 4/2012 |
| JP | 2012-084049 | 4/2012 |
| JP | 2012-138026 | 7/2012 |
| JP | 2012-141650 | 7/2012 |
| JP | 2012-160176 | 8/2012 |
| JP | 2013-022986 | 2/2013 |
| JP | 2013-117900 | 6/2013 |
| JP | 2013-156888 | 8/2013 |
| JP | 2013-161221 | 8/2013 |
| JP | 2013-222283 | 10/2013 |
| JP | 2014-078116 | 5/2014 |
| JP | 2014-081666 | 5/2014 |
| JP | 2014-109883 | 6/2014 |
| JP | 5519871 B | 6/2014 |
| JP | 2014-123288 | 7/2014 |
| WO | 2002/035460 | 5/2002 |
| WO | 2002/035461 | 5/2002 |
| WO | 2006/133018 | 12/2006 |
| WO | 2010/122825 | 10/2010 |
| WO | 2014/098946 | 6/2014 |

OTHER PUBLICATIONS

U.S. Appl. No. 14/643,344 to Takeshi Yamaguchi et al., filed Mar. 10, 2015.
U.S. Appl. No. 14/643,201 to Takeshi Yamaguchi et al., filed Mar. 10, 2015.
British Search Report dated Aug. 17, 2015 for British Patent Application No. GB1503428.3.
British Search Report dated Aug. 17, 2015 for British Patent Application No. GB1503429.1.
British Search Report dated Aug. 17, 2015 for British Patent Application No. GB1503430.9.
British Search Report dated Aug. 17, 2015 for the related British Patent Application No. GB1503431.7.

* cited by examiner

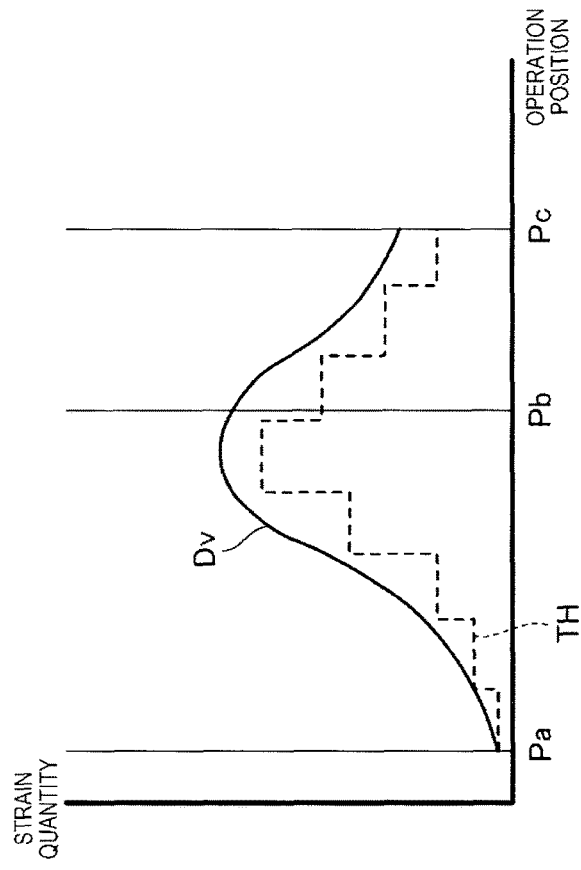
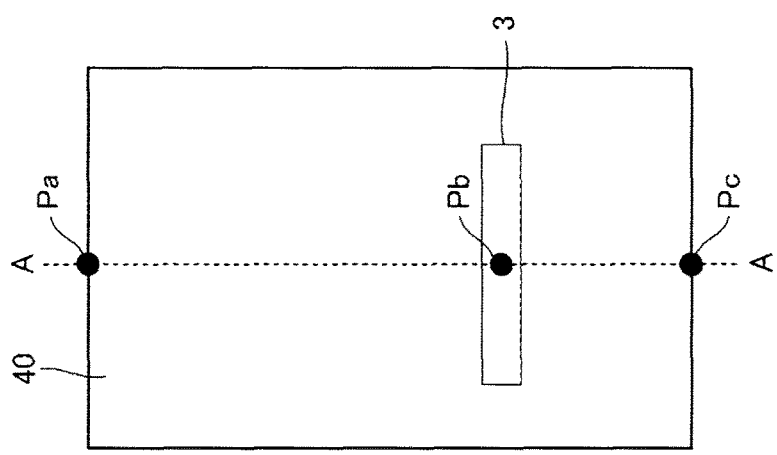

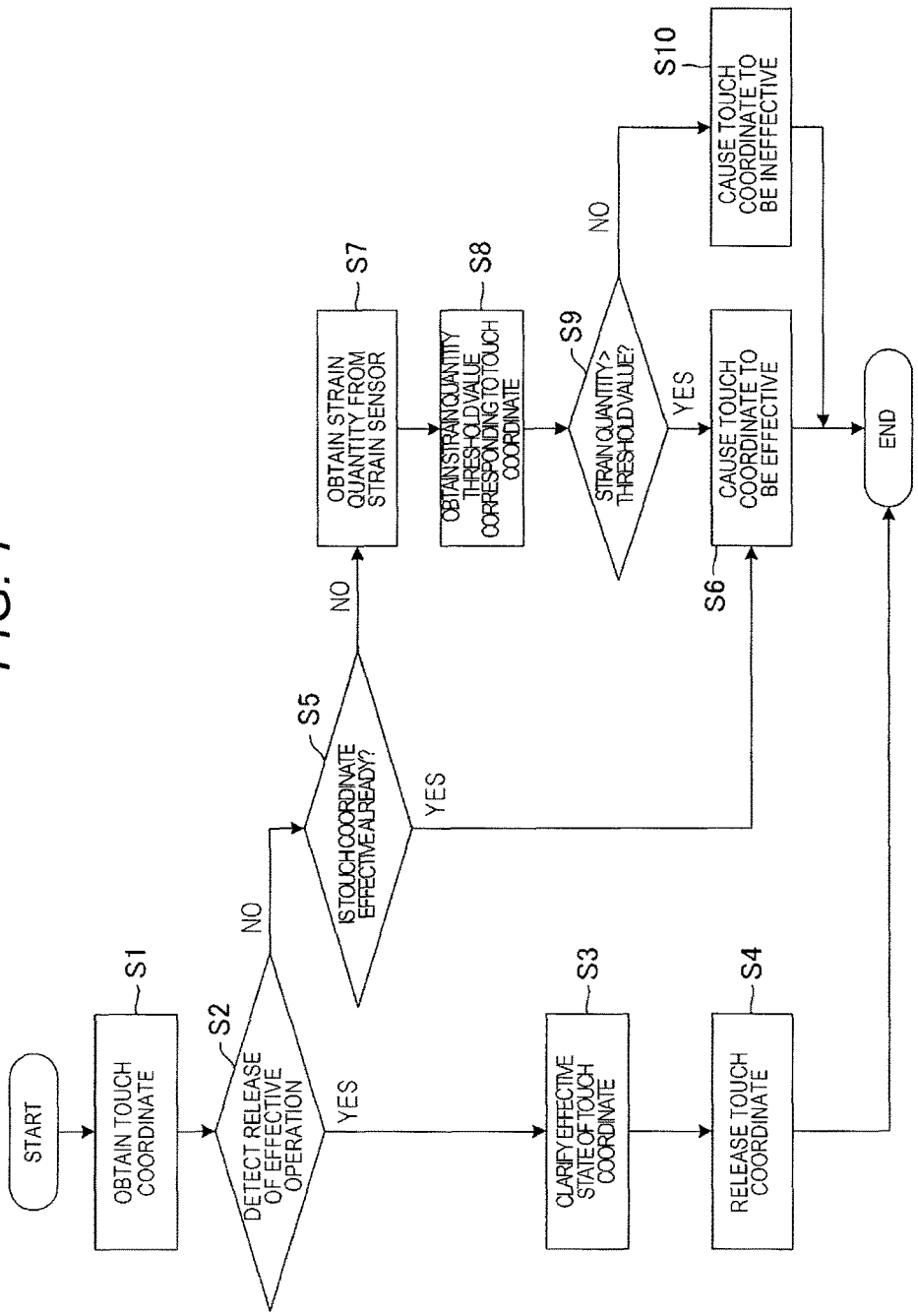

FIG. 19

| 500 | 500 | 500 | 500 | 500 |
|-----|-----|-----|-----|-----|
| 500 | 3   | 7   | 3   | 500 |
| 500 | 10  | 15  | 10  | 500 |
| 500 | 25  | 40  | 25  | 500 |
| 500 | 50  | 70  | 50  | 500 |
| 500 | 40  | 50  | 40  | 500 |
| 500 | 25  | 30  | 25  | 500 |
| 500 | 500 | 500 | 500 | 500 |

PRIOR ART

ELECTRONIC APPARATUS WHICH EFFECTS TOUCH COORDINATE BASED ON PROXIMITY AND STRAIN

CROSS REFERENCE TO RELATED APPLICATIONS

This application claims priority to Japanese Patent Application No. 2014-127381 filed Jun. 20, 2014, the entire contents of which are incorporated by reference herein.

BACKGROUND OF THE INVENTION

1. Field of the Invention

The present invention relates to an electronic apparatus including a touch panel.

2. Description of the Related Art

An electronic apparatus such as a smartphone and a tablet, in which a touch panel is mounted, has come into wide use. The electronic apparatus may include an electrostatic capacitive touch panel. The electrostatic capacitive touch panel can receive "touch operation" performed by directly bringing a finger of a bare hand into contact with a surface of the touch panel and "hover operation" performed by causing a finger to be positioned at a predetermined height from the surface of the touch panel, without bringing the finger of the bare hand onto contact with the surface of the touch panel. Accordingly, a user can perform an operation with a finger covered with gloves in addition to a bare hand.

FIG. 20 is a diagram illustrating a basic configuration of an electrostatic capacitive touch panel. In FIG. 20, a transmission electrode 101 and a reception electrode 102 are disposed on a lower surface of a dielectric plate 100 at a distance from each other and a driving pulse is applied to the transmission electrode 101 from a driving buffer 103. An electric field is generated when the driving pulse is applied. When a finger or the like enters into the electric field, the number of lines of electric force between the transmission electrode 101 and the reception electrode 102 is reduced and a variation in the number of lines of electric force appears as a variation in the charge in the reception electrode 102. A finger approaching a touch panel is detected from a variation in the charge in the reception electrode 102. An actual touch panel has a plurality of transmission electrodes 101 and a plurality of reception electrodes 102 and detects an instructing object planarly.

FIG. 21 is a diagram illustrating a detection state of a finger when the finger approaches the touch panel gradually. In FIG. 21, FIG. 21(a) illustrates a state when a finger is out of an electric field, FIG. 21(b) illustrates a finger hovering detection state when a finger is in an electric field, and FIG. 21(c) illustrates a finger touch detection state when a finger is completely in an electric field and is brought onto contact with a touch panel.

Examples of a touch panel of a type of receiving "touch operation" are disclosed in Japanese Patent Unexamined Publication No. 2009-087311 and Japanese Patent Unexamined Publication No. 2006-323457.

In an electrostatic capacitive touch panel, a two-dimensional coordinate obtained when water or the like is attached to a surface of the panel is caused to be effective in some cases. This problem can be avoided by detecting the strength of pressure on the touch panel and not detecting pressure occurring due to attachment of water or the like. For example, strain when water or the like is attached is detected by using a strain sensor and a two-dimensional coordinate when a detected strain quantity is equal to or less than a predetermined threshold value is not caused to be effective.

However, when a two-dimensional coordinate obtained by attachment of water or the like being caused to be effective is prevented by using a strain sensor, if an interval (sampling interval) for obtaining a two-dimensional coordinate from the touch panel is longer than a variation time of a strain quantity detected by the strain sensor, it may be difficult to accurately obtain variation in the strain quantity. FIG. 22 is a diagram illustrating an example when a sampling interval Ta for a two-dimensional coordinate is longer than a variation time of a strain quantity. As illustrated in FIG. 22, the maximum value Dvmax of a strain quantity Dv obtained through the touch operation is within the sampling interval Ta of a two-dimensional coordinate and any one of strain quantities Dv1, Dv2, and Dv3 at obtaining timings t1, t2, and t3 of the two-dimensional coordinate is below the strain quantity threshold value TH. Accordingly, the two-dimensional coordinate obtained through the touch operation at this time is not caused to be effective. As in this example, if variation in strain quantity may be accurately obtained, a two-dimensional coordinate obtained through the touch operation is not caused to be effective though there is a touch operation. If being original, it is necessary that a two-dimensional coordinate obtained through a touch operation after the strain quantity Dv exceeds the strain quantity threshold value TH is effective. If there is attachment of water or the like, a two-dimensional coordinate obtained by this may or may be not caused to be effective. However, if there is a touch operation performed by an instructing object such as a finger, it is necessary that a two-dimensional coordinate obtained by this is effective.

Considering these circumstances, an object of the present invention is to provide an electronic apparatus in which when a sampling interval for obtaining a two-dimensional coordinate from a touch panel is longer than a variation time of strain quantity detected by a strain sensor, it is also possible to accurately obtain variation in the strain quantity and it is possible to reliably cause a two-dimensional coordinate obtained by an operation of an instructing object such as a finger to be effective.

SUMMARY OF THE INVENTION

An electronic apparatus according to the present invention includes a casing, a display unit that is disposed in the casing and displays predetermined information, an electrostatic capacitive touch panel unit through which display of the display unit passes and that determines a two-dimensional coordinate indicated by an instructing object which has some conductivity, a transparent member that is disposed to be stacked on the touch panel unit and through which display of the display unit passes, and a pressure detection unit that detects strain of the transparent member. The touch panel unit is able to detect that the instructing object is separated at a predetermined distance or more. When strain detected by the pressure detection unit satisfies a predetermined condition, a two-dimensional coordinate determined by the touch panel unit is caused to be effective and the two-dimensional coordinate is caused to be effective continuously until the instructing object is separated at the predetermined distance or more.

According to the configuration, since a two-dimensional coordinate determined by the touch panel unit is caused to be effective when strain detected by the pressure detection unit satisfies the predetermined condition, it is also possible to accurately obtain variation in the strain quantity and it is possible to reliably cause a two-dimensional coordinate obtained by an operation of an instructing object such as a finger to be effective when a sampling interval for obtaining a two-dimensional coordinate from the touch panel unit is longer than a variation time of a strain quantity detected by the pressure detection unit (corresponding to a strain sensor).

Since if the two-dimensional coordinate is caused to be effective once, the two-dimensional coordinate is caused to be effective continuously until the instructing object such as a finger is separated from the touch panel unit at the predetermined distance or more, it is possible to prevent determination to be ineffective when a flicking operation is performed, for example.

In the configuration, when strain detected by the pressure detection unit is larger than at least a predetermined value, a two-dimensional coordinate determined by the touch panel unit may be caused to be effective and the two-dimensional coordinate may be caused to be effective continuously until the instructing object is separated at the predetermined distance or more.

According to the configuration, when strain detected by the pressure detection unit is larger than at least a predetermined value, a two-dimensional coordinate determined by the touch panel unit is caused to be effective and effectiveness continues until the instructing object is separated at the predetermined distance or more, and thus it is possible to reliably cause a two-dimensional coordinate obtained by an operation of an instructing object such as a finger to be effective and it is possible to prevent determination to be ineffective when a flicking operation is performed, for example.

In the configuration, the predetermined distance may be set to 0 (zero).

According to the configuration, since a two-dimensional coordinate determined by the touch panel unit is caused to be effective even when an operation is performed by an instructing object being directly brought onto contact with the touch panel unit and such a state continues until the instructing object is separated from the touch panel unit, it is possible to reliably cause a two-dimensional coordinate obtained by a touch operation of an instructing object such as a finger to be effective and it is possible to prevent determination to be ineffective when a flicking operation is performed, for example.

In the configuration, when strain detected by the pressure detection unit satisfies a predetermined condition, a two-dimensional coordinate determined by the touch panel unit may be caused to be effective, the two-dimensional coordinate may be caused to be effective continuously until the instructing object is separated at the predetermined distance or more, and after the instructing object is separated at the predetermined distance or more, the two-dimensional coordinate may be caused to be ineffective.

According to the configuration, since the instructing object is separated at the predetermined distance or more and then the two-dimensional coordinate is caused to be ineffective, it is possible to prevent determination to be ineffective when a flicking operation is performed, for example and to improve operability.

In the configuration, the pressure detection unit may detect strain of the transparent member by using a piezoelectric element.

According to the configuration, it is possible to detect strain of the transparent member with high accuracy.

In the configuration, the pressure detection unit may detect strain of the transparent member by using a piezoelectric film.

According to the configuration, it is possible to detect strain of the transparent member with high accuracy.

In the configuration, the piezoelectric film may be disposed on a surface of the display unit opposite to the touch panel unit.

According to the configuration, it is possible to detect strain of the transparent member with high accuracy.

A control method according to the present invention allowed to be used in an electronic apparatus including a casing, a display unit that is disposed in the casing and displays predetermined information, an electrostatic capacitive touch panel unit through which display of the display unit passes and that determines a two-dimensional coordinate indicated by an instructing object which has some conductivity, a transparent member that is disposed to be stacked on the touch panel unit and through which display of the display unit passes, and a pressure detection unit that detects strain of the transparent member, and in which the touch panel unit is able to detect that the instructing object is separated at a predetermined distance or more, the method includes: causing a two-dimensional coordinate determined by the touch panel unit to be effective, and the two-dimensional coordinate to be effective continuously until the instructing object is separated at a predetermined distance or more when strain detected by the pressure detection unit satisfies a predetermined condition.

According to the method, since a two-dimensional coordinate determined by the touch panel unit is caused to be effective when strain detected by the pressure detection unit satisfies the predetermined condition, it is also possible to accurately obtain variation in the strain quantity and it is possible to reliably cause a two-dimensional coordinate obtained by an operation of an instructing object such as a finger to be effective when a sampling interval for obtaining a two-dimensional coordinate from the touch panel unit is longer than a variation time of a strain quantity detected by the pressure detection unit (corresponding to a strain sensor).

If the two-dimensional coordinate is caused to be effective once, the two-dimensional coordinate is caused to be effective continuously until the instructing object such as a finger is separated from the touch panel unit at the predetermined distance or more, and thus it is possible to prevent determination to be ineffective when a flicking operation is performed, for example.

According to the invention, when a two-dimensional coordinate obtained by attachment of water or the like being caused to be effective is prevented by using a strain sensor, even if a sampling interval for obtaining a two-dimensional coordinate from a touch panel is longer than a variation time of a strain quantity detected by the strain sensor, it is possible to accurately detect variation in strain quantity and to reliably cause a two-dimensional coordinate obtained by an operation of an instructing object such as a finger to be effective.

BRIEF DESCRIPTION OF DRAWINGS

FIGS. 6A and 6B are diagrams illustrating the positional relationship of the pressure detection unit on an operation surface of the electronic apparatus according to Exemplary Embodiment 1 and illustrating a strain quantity allowed to be detected when touching is performed with the same extent of strength on an A-A line on the operation surface, in the positional relationship;

FIG. 7 is a flowchart illustrating an operation of a control unit of the electronic apparatus according to Exemplary Embodiment 1;

FIG. 19 is a diagram illustrating an example of a strain quantity threshold value in the electronic apparatus according to Exemplary Embodiment 4;

DETAILED DESCRIPTION OF THE PREFERRED EMBODIMENTS

Hereinafter, a preferred exemplary embodiment for implementing the present invention will be described in detail with reference to the drawings.

Exemplary Embodiment 1

Figure 1:
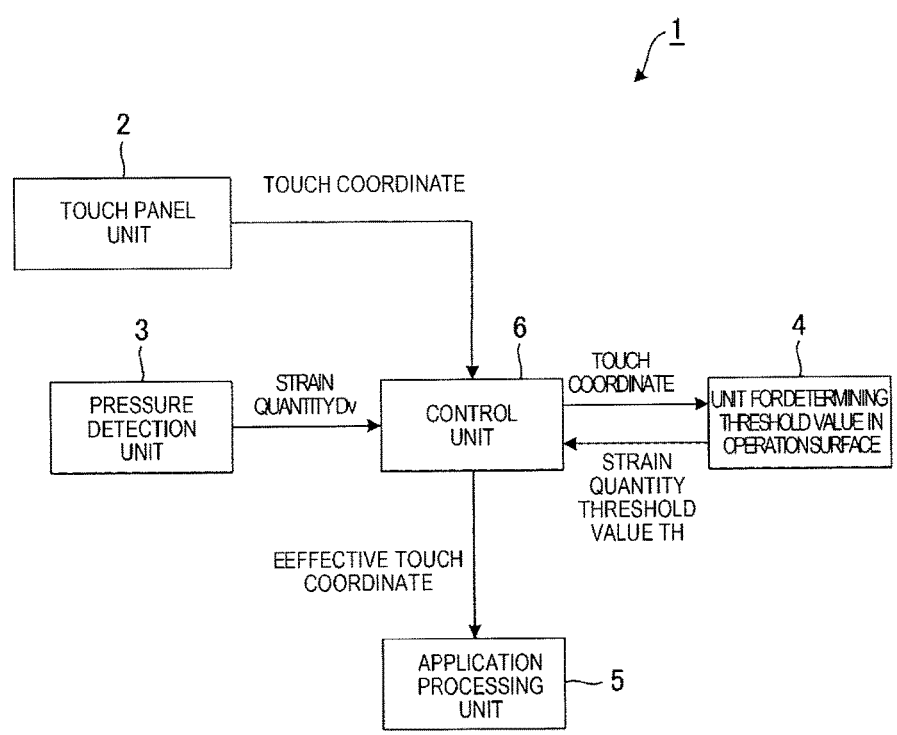
FIG. 1 is a block diagram illustrating a schematic configuration of an electronic apparatus according to Exemplary Embodiment 1 of the present invention.
Figure 2:
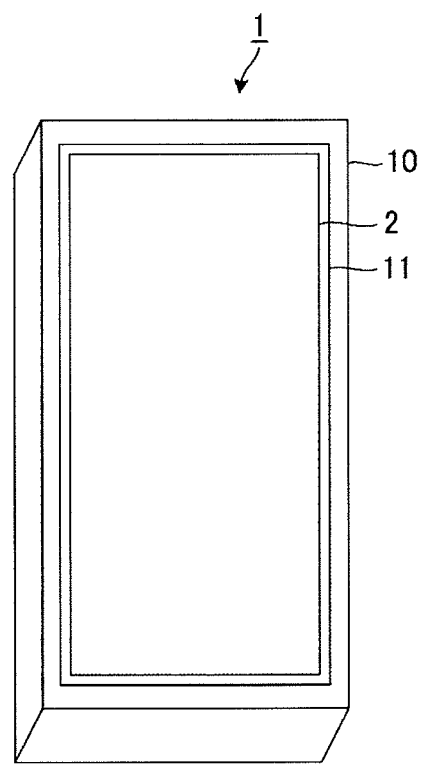
FIG. 2 is a perspective view illustrating an appearance of the electronic apparatus according to Exemplary Embodiment 1.
Figure 3:
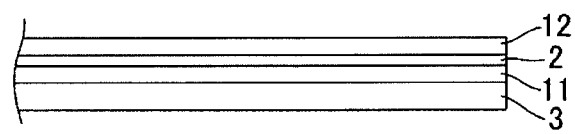
FIG. 3 is a cross-sectional view illustrating a pressure detection unit, a display unit, a touch panel unit, and a transparent member of the electronic apparatus according to Exemplary Embodiment 1.

FIG. 1 is a block diagram illustrating a schematic configuration of an electronic apparatus according to Exemplary Embodiment 1 of the present invention. FIG. 2 is a perspective view illustrating the appearance of the electronic apparatus in FIG. 1. FIG. 3 is a cross-sectional view illustrating a pressure detection unit, a display unit, a touch panel unit, and a transparent member of the electronic apparatus in FIG. 1. The electronic apparatus 1 according to this exemplary embodiment is applied to a portable wireless device referred to as a smartphone, for example and a part functioning as a wireless device is not illustrated in the block diagram of FIG. 1.

In FIG. 1, the electronic apparatus 1 according to this exemplary embodiment includes the touch panel unit 2, the pressure detection unit 3, a unit for determining threshold value in operation surface 4, an application processing unit 5, and a control unit 6. As illustrated in FIG. 2, the electronic apparatus 1 according to this exemplary embodiment includes a rectangular casing 10. The touch panel unit 2 and the display unit 11 are disposed on the front surface side of the casing 10. In this case, as illustrated in FIG. 3, regarding the touch panel unit 2, the pressure detection unit 3, the display unit 11, and the transparent member 12, the touch panel unit 2 and the transparent member 12 are disposed to be stacked on an upper surface side of the display unit 11 in this order and the pressure detection unit 3 is disposed on a lower surface side of the display unit 11. The touch panel unit 2 and the display unit 11 have a surface shape having an area a little smaller than an area of the front surface of the casing 10 and are formed with a rectangular shape in a plan view. In this case, the area of the touch panel unit 2 is a little smaller than the area of the display unit 11. The touch panel unit 2 is disposed to be stacked on a display surface side of the display unit 11 and thus the touch panel unit 2 is substantially parallel with the display surface of the display unit 11.

Figure 20:
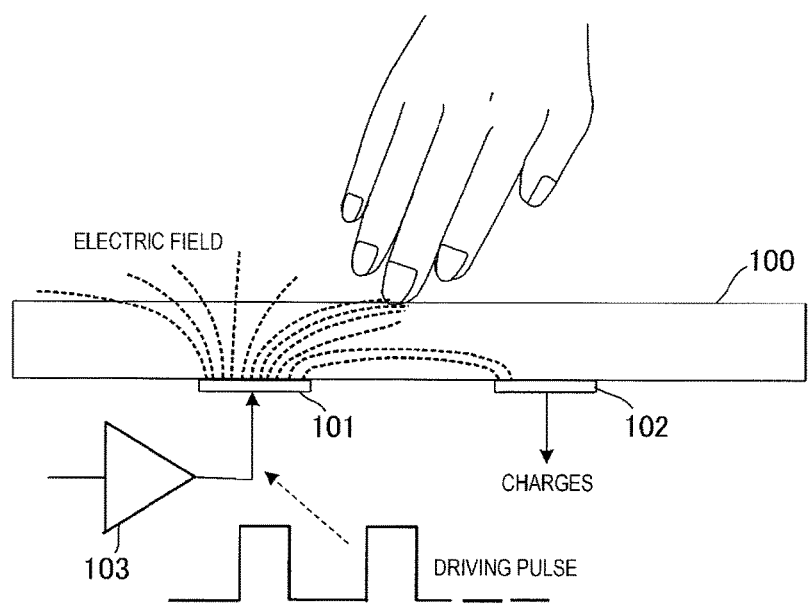
FIG. 20 is a diagram illustrating a schematic configuration of an electrostatic capacitive touch panel.
Figure 21:
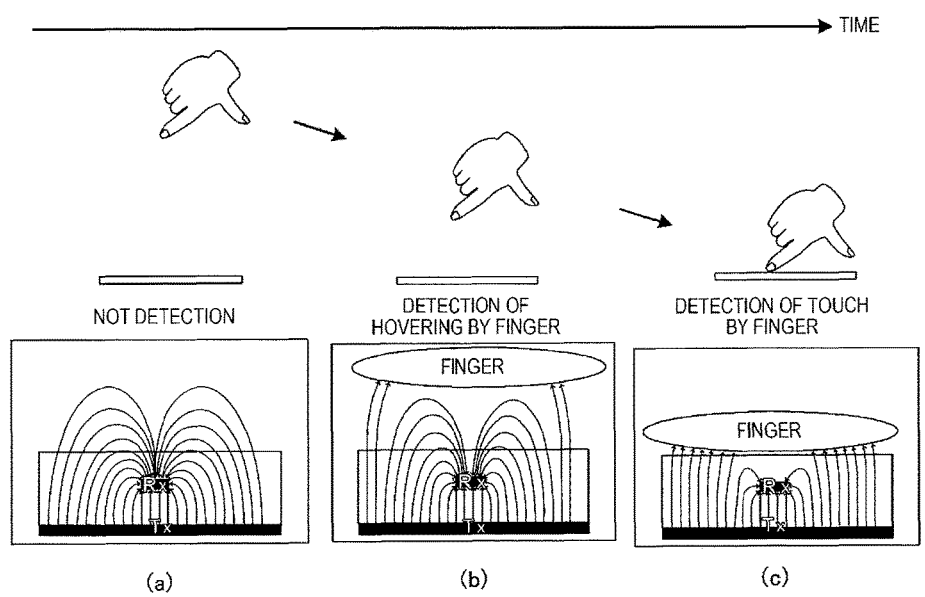
FIGS. 21(a) to 21(c) are diagrams illustrating a detection state of a finger when the finger approaches the touch panel gradually.
Figure 22:
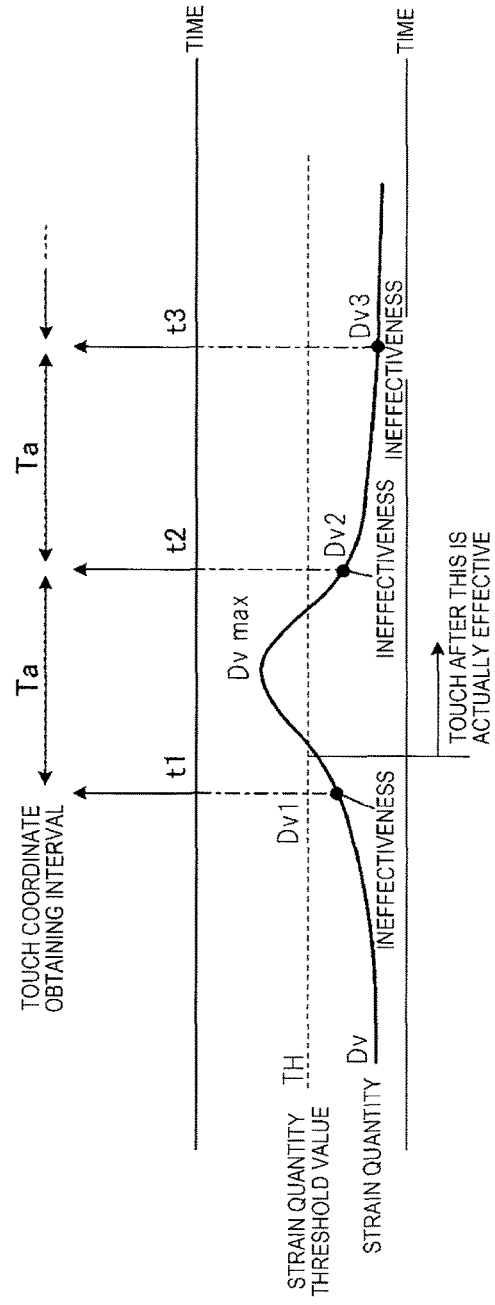
FIG. 22 is a diagram illustrating an example when a sampling interval for a two-dimensional coordinate is longer than a variation time of a strain quantity.

In FIG. 1, the touch panel unit 2 employs an electrostatic capacitive type touch panel in which an operation (referred to as a "hover operation") within a height of a predetermined range is possible without an instructing object (a finger of a user, a pen, and the like) being brought onto contact with an operation surface of the touch panel unit 2. The touch panel unit 2 is disposed to be stacked on a display surface side of the display unit 11, passes through display of the display unit 11, determines a two-dimensional coordinate (below, referred to as "touch coordinate") indicated by the instructing object having some conductivity, and outputs the determined touch coordinate. As illustrated in FIG. 20, the touch panel unit 2 includes a transmission electrode 101 and a reception electrode 102 which are disposed on a lower surface of a dielectric plate 100 at a distance from each other. A driving pulse based on a transmission signal is applied to the transmission electrode 101. An electric field is generated from the transmission electrode 101 by applying the driving pulse to the transmission electrode 101. When a finger or the like enters into the electric field, the number of lines of electric force between the transmission electrode 101 and the reception electrode 102 is reduced and a variation in the number appears as a variation in the charge in the reception electrode 102.

The touch panel unit 2 includes a plurality of transmission electrodes 101 and a plurality of reception electrodes 102 and detects the instructing object planarly. The touch panel unit 2 outputs a coordinate (touch coordinate) of the center of the instructing object along the operation surface of the touch panel unit 2 by detecting the instructing object to the control unit 6. The touch panel unit 2 causes a perpendicular distance from the operation surface of the touch panel unit 2 to the instructing object to be included in the touch coordinate when the touch coordinate is output. That is, the touch panel unit 2 outputs a two-dimensional coordinate corresponding to a touch position and a perpendicular distance to the control unit 6.

In FIG. 2 and FIG. 3, the display unit 11 is formed to have a rectangular shape and is used in display for operating the electronic apparatus 1 or display of an image and the like. A liquid crystal display (LCD), an organic electroluminescence (EL) or a display device such as electronic paper is used as the display unit 11. In FIG. 3, the transparent member 12 is disposed to be stacked on the upper surface side of the touch panel unit 2 and passes through display of the display unit 11. The transparent member 12 may be integrally formed with the touch panel unit 2 or may be formed separately from the touch panel unit 2.

Figure 4:
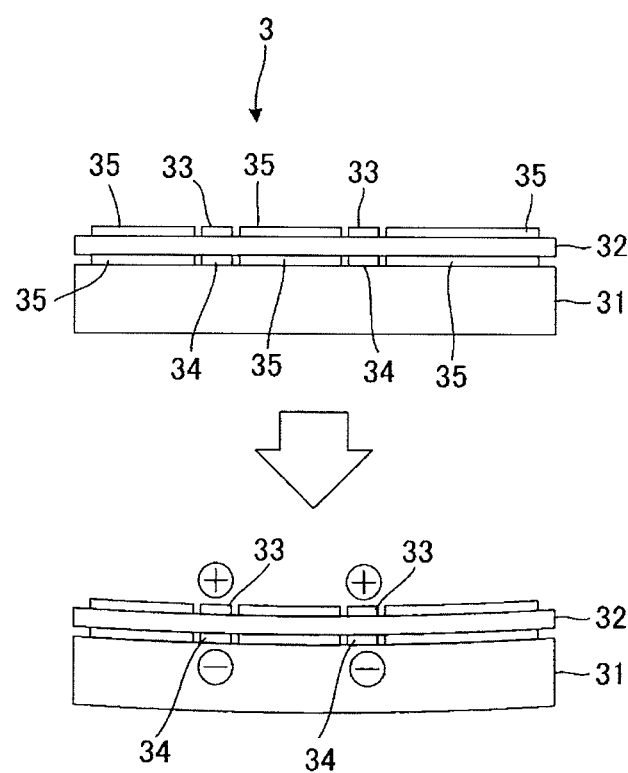
FIG. 4 is a diagram illustrating a schematic configuration of the pressure detection unit of the electronic apparatus according to Exemplary Embodiment 1.

In FIG. 1 and FIG. 3, the pressure detection unit 3 is disposed to be stacked on the lower surface side of the display unit 11 and detects strain in the transparent member 12. The pressure detection unit 3 includes a strain sensor (not illustrated) having an area smaller than that of the transparent member 12 and outputs strain detected by the strain sensor as a strain quantity. For example, a piezoelectric element or a piezoelectric film is used as the strain sensor of the pressure detection unit 3. A configuration of the pressure detection unit 3 using a piezoelectric film and a detection principle of pressing force generated by the piezoelectric film will be described. FIG. 4 is a diagram illustrating a schematic configuration of the pressure detection unit 3 using a piezoelectric film. In FIG. 4, the pressure detection unit 3 includes a base plate 31 and a piezoelectric film 32 and has a structure in which the base plate 31 and the piezoelectric film 32 are stacked on each other. Pressing force detecting electrode patterns 33 and 34 are formed on both surfaces of the piezoelectric film 32. Charges are generated in the piezoelectric film 32 due to minute bending of the base plate 31 and a voltage is generated between the pressing force detecting electrode patterns 33 and 34. It is possible to detect pressing force based on the voltage. Since charges are generated in the piezoelectric film 32 by slight bending of the base plate 31, it is also possible to detect small pressing force. Predetermined patterns 35 other than the pressing force detecting electrode patterns 33 and 34 are disposed on both of the surfaces of the piezoelectric film 32 in the pressure detection unit 3 of FIG. 4. The predetermined patterns 35 may be used similarly to the pressing force detecting electrode pattern 33 and 34, and may be used for causing a signal to be transmitted.

In FIG. 1, the unit for determining threshold value in operation surface 4 determines a threshold value corresponding to the touch coordinate output from the touch panel unit 2 and outputs the determined threshold value as a threshold value (below referred to as a "strain quantity threshold value (predetermined threshold value)" TH) of the strain quantity. The strain quantity threshold value TH is set for each subdivision which is obtained by dividing the operation surface of the touch panel unit 2 into predetermined subdivisions. Examples of the shape of the subdivision include a quadrangle and a triangle.

Figures 5A, 5B:
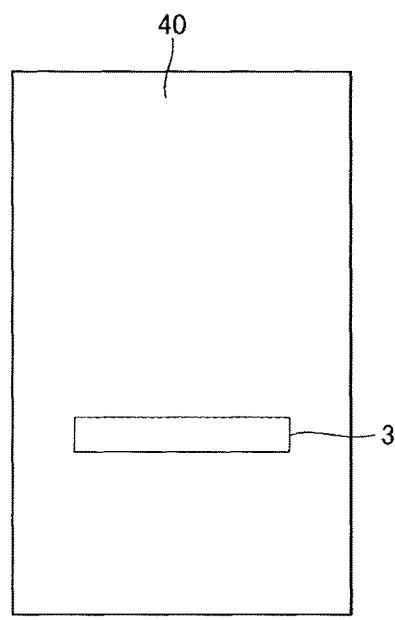
FIGS. 5A and 5B are diagrams illustrating a specific example of a strain quantity threshold value set in the electronic apparatus according to Exemplary Embodiment 1.

FIGS. 5A and 5B are diagrams illustrating a specific example of the strain quantity threshold value TH. In this case, as illustrated in FIG. 5A, the pressure detection unit 3 is disposed at a position which is a little lower than the center of the operation surface 40 of the touch panel unit 2. The strain quantity threshold value TH is set for each subdivision which is obtained by dividing the operation surface 40 of the touch panel unit 2 into 40 subdivisions of breadthwise 5×lengthwise 8. In this case, as illustrated in FIG. 5B, a large strain quantity threshold value TH is set in a portion 41 at which a detectable strain quantity is large physically such as the vicinity of the pressure detection unit 3 and a small strain quantity threshold value TH is set in a portion 42 at which a detectable strain quantity is small physically such as an end of the operation surface 40. For example, each strain quantity threshold value TH of "50", "70", "50", "40", "50", and "40" is set in the portion 41 at which the pressure detection unit 3 is disposed. Each strain quantity threshold value TH of "1", "2", "3", "2", and "1" is set in the portion 42 which is the farthest from a portion at which the pressure detection unit 3 is disposed. In this manner, the strain quantity threshold value TH is set for each divided predetermined subdivision which is obtained by dividing the operation surface 40 of the touch panel unit 2 into a plurality of subdivisions.

In FIG. 1, the strain quantity threshold value TH determined by the unit for determining threshold values in operation surface 4 is output to the control unit 6. The control unit 6 is configured by a central processing unit (CPU), a read only memory (ROM), a random access memory (RAM), and an interface circuit. A program for controlling the CPU is stored in the ROM and the RAM is used when the CPU is operated. The control unit 6 obtains a touch coordinate determined by the touch panel unit 2 for each constant period and outputs the obtained touch coordinate to the unit for determining threshold value in operation surface 4. The control unit 6 receives a strain quantity Dv detected by the pressure detection unit 3 and receives the strain quantity threshold value TH determined by the unit for determining threshold values in operation surface 4. The control unit 6 compares the strain quantity Dv with the strain quantity threshold value TH. When the strain quantity Dv detected by the pressure detection unit 3 is larger than the strain quantity threshold value TH determined by the unit for determining threshold values in operation surface 4, the touch coordinate determined by the touch panel unit 2 is caused to be effective and the touch coordinate caused to be effective is output as an effective touch coordinate to the application processing unit 5. The application processing unit 5 performs various processes based on the effective touch coordinate. Description is not necessary, but the strain quantity Dv and the strain quantity threshold value TH which are compared by the control unit 6 are obtained at the same touch coordinate (particularly, two-dimensional coordinate).

FIGS. 6A and 6B are diagrams illustrating a positional relationship of the touch panel unit 2 on the operation surface 40 and illustrating the strain quantity Dv allowed to be detected when touching is performed with the same extent of strength on an A-A line on the operation surface 40, in the positional relationship. As illustrated in FIG. 6A, a touch position Pa on the operation surface 40 corresponds to a position on the A-A line at an upper end (an end on an upper side towards the drawing is referred to as an upper end) of the operation surface 40. A touch position Pb corresponds to a position on a position of the pressure detection unit 3 on the A-A line in the operation surface 40. A touch position Pc corresponds to a position on the A-A line at a lower end (an end on a lower side toward the drawing is referred to a lower end) of the operation surface 40.

The touch position Pa is farthest from the pressure detection unit 3 and the detected strain quantity Dv has a small value as illustrated in FIG. 6B. The pressure detection unit 3 is disposed at the touch position Pb and the detected strain quantity Dv has a large value as illustrated in FIG. 6B. The touch position Pc is at a distance which is substantially a half of a distance from the pressure detection unit 3 to the touch position Pa and the detected strain quantity Dv has a value larger than the strain quantity Dv at the touch position Pa and smaller than the strain quantity Dv at the touch position Pb.

The strain quantity threshold value TH is set so as to determine effectiveness of an operation toward the operation surface 40 of the touch panel unit 2. The strain quantity threshold value TH is set for each subdivision of the operation surface 40 which is divided into a plurality of subdivisions as described above. The strain quantity threshold value which is set for each subdivision is smaller than a strain quantity detected by the pressure detection unit 3 when touching is performed for each subdivision. With this, a touch coordinate obtained by an operation in which touching is performed any point on the operation surface 40 becomes effective. The minimum value of the strain quantity threshold value TH is set to a value for not performing detection when water or the like is attached to the operation surface 40 or a value which is larger than a value of an electric noise. That is, the minimum value of the strain quantity threshold value TH is set to a value which is larger than a strain quantity when water or the like is attached to the operation surface 40. A touch coordinate obtained by water is not effective even when the water or the like is attached to the operation surface 40, by determining a value of the strain quantity threshold value TH in this manner.

FIG. 7 is a flowchart illustrating an operation of the control unit 6 of the electronic apparatus 1 according to Exemplary Embodiment 1. In FIG. 7, the control unit 6 obtains a touch coordinate output from the touch panel unit 2 (Step S1) and outputs the obtained touch coordinate to the unit for determining threshold values in operation surface 4. That is, a user touching the operation surface 40 of the touch panel unit 2 causes the touch panel unit 2 to determine a touch coordinate corresponding to a touch position and to output the determined touch coordinate to the unit for determining threshold value in operation surface 4.

The control unit 6 determines whether or not release of an effective operation can be detected, based on the obtained touch coordinate after the coordinate is output to the unit for determining threshold value in operation surface 4 (Step S2). In the electronic apparatus 1 according to this exemplary embodiment, the operation is effective for a period from a time when the operation surface 40 of the touch panel unit 2 is touched with a finger to a time when the touch is released (is separated from the operation surface 40). Thus, if a finger is released from the operation surface 40, it is determined that an effective operation is released. That is, the control unit 6 traces the touch coordinate and recognizes an operation when the touch coordinate is changed to any coordinate as an operation performed by the same finger.

The control unit 6 determines the touch coordinate which is determined to be effective once to be effective until a finger is determined to be released from the operation surface 40 of the panel unit 2.

The control unit 6 causes an effective state of the touch coordinate to be clear when it is determined that release of the effective operation is detected (when there is determination of YES in Step S2) (Step S3). That is, the touch coordinate is caused to be ineffective. After the effective state of the touch coordinate is caused to be clear, the touch coordinate is released (Step S4) and the process is ended.

In the determination of Step S2, the control unit 6 determines whether or not the touch coordinate is already effective when it is determined that it is difficult to detect release of the effective operation (when there is determination of NO in Step S2), that is, when it is determined that a finger is not separated from the operation surface 40 (Step S5). That is, the control unit 6 determines whether or not a state where a finger comes into contact with the operation surface 40 of the touch panel unit 2 continues. In this determination, when it is determined that the touch coordinate is already effective (when there is determination of YES in Step S5), that is, when it is determined that the state where a finger comes into contact with the operation surface 40 continues, the touch coordinate is caused to be effective (Step S6) and the process is ended.

The control unit 6 obtains a strain quantity Dv detected by the pressure detection unit 3 when it is determined that the touch coordinate is not effective (when there is determination of NO in Step S5), that is, when the touch coordinate is obtained, but a strain quantity is smaller than the predetermined threshold value (Step S7). The control unit 6 obtains a strain quantity threshold value TH corresponding to the touch coordinate (particularly, two-dimensional coordinate) from the unit for determining threshold value in operation surface 4 (Step S8). A strain quantity Dv in the touch coordinate is obtained, a strain quantity threshold value TH corresponding to the touch coordinate is obtained, and then the obtained strain quantity Dv and strain quantity threshold value TH are compared (Step S9). When it is determined that the strain quantity Dv is larger than the strain quantity threshold value TH (when there is determination of YES in Step S9), the touch coordinate is caused to be effective (Step S6) and the process is ended. On the other hand, when it is determined that the strain quantity Dv is equal to or less than the strain quantity threshold value TH (when there is determination of NO in Step S9), the touch coordinate is caused to be ineffective (Step S10) and the process is ended. The above processes (Steps S1 to S10) are executed whenever a touch coordinate is obtained.

With such the electronic apparatus 1 according to Exemplary Embodiment 1, a strain quantity threshold value TH is set in accordance with a distance from the pressure detection unit 3 for each divided predetermined subdivision which is obtained by dividing the operation surface 40 of the touch panel unit 2 into a plurality of predetermined subdivisions. Thus, a touch coordinate obtained through an operation of touching any point on the operation surface 40 of the touch panel unit 2 is effective. In addition, the minimum value of the strain quantity threshold value TH is set to be a value which is larger than a strain quantity Dv when water or the like is attached to the operation surface 40 of the touch panel unit or to be a value which is larger than a value of an electric noise. Thus, a touch coordinate obtained by water is not effective when the water or the like is attached to the operation surface 40.

Exemplary Embodiment 2

Figure 8:
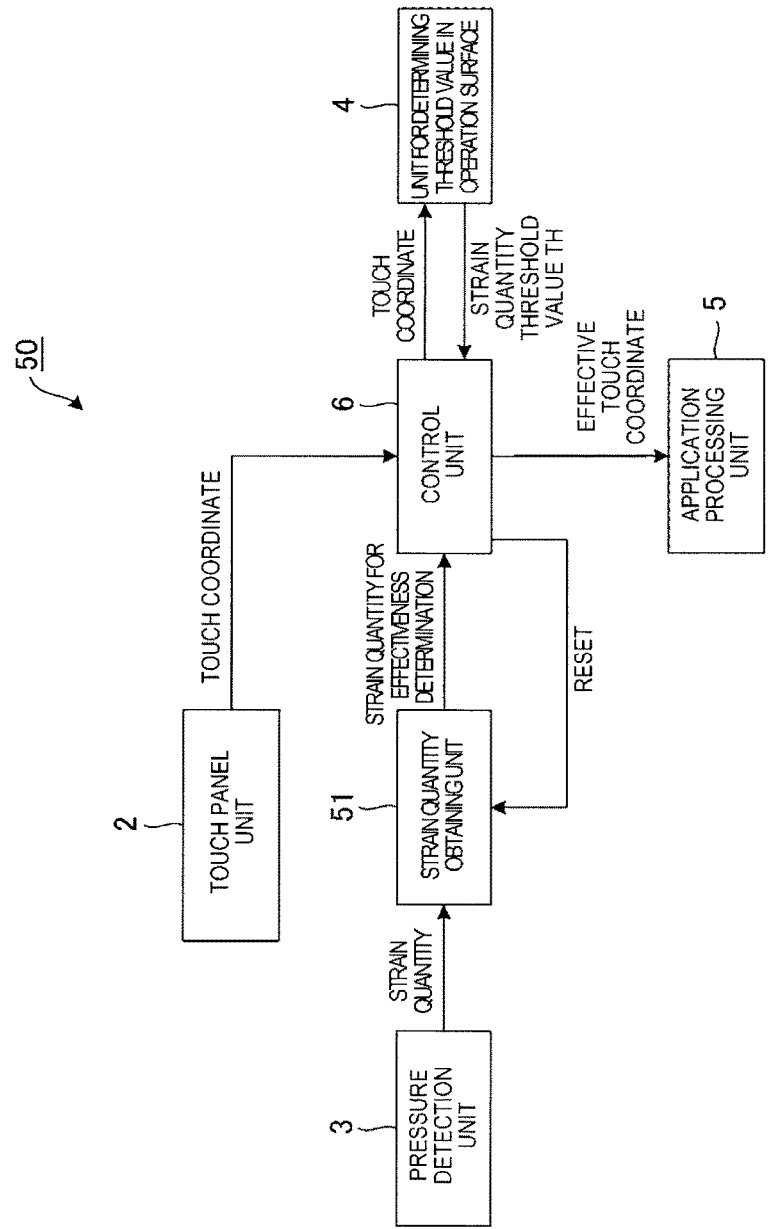
FIG. 8 is a block diagram illustrating a schematic configuration of an electronic apparatus according to Exemplary Embodiment 2 of the present invention.

FIG. 8 is a block diagram illustrating a schematic configuration of an electronic apparatus according to Exemplary Embodiment 2 of the present invention. In FIG. 8, components common as the above described components in FIG. 1 are denoted by the same reference numerals and descriptions thereof will be omitted. In the electronic apparatus 50 according to Exemplary Embodiment 2, variation in strain quantity may be also accurately obtained when a variation time of a strain quantity is shorter than an obtaining interval (sampling interval) of a touch coordinate and a strain quantity obtaining unit 51 is included as a unit for causing this to be possible.

Figure 9:
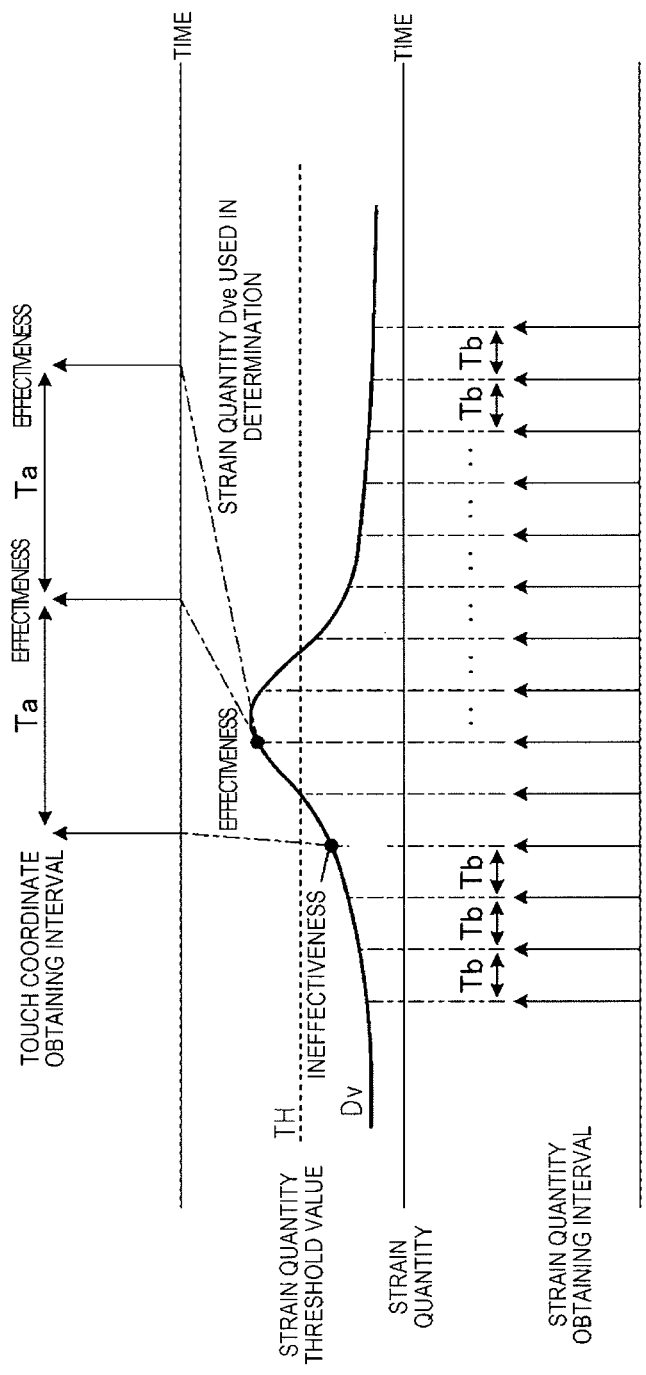
FIG. 9 is a diagram illustrating a strain quantity obtaining process for determination in the electronic apparatus according to Exemplary Embodiment 2.

FIG. 9 is a diagram illustrating a strain quantity obtaining process for determination in the electronic apparatus 50 according to Exemplary Embodiment 2. As illustrated in FIG. 9, a strain quantity obtaining unit 51 obtains a strain quantity Dv at an interval (below referred to as a "strain quantity obtaining interval Tb") which is faster than variation in the strain quantity Dv, stores the maximum value of the strain quantity Dv, and outputs the maximum value of the strain quantity Dv as a strain quantity for effectiveness determination Dve to the control unit 6. The strain quantity obtaining unit 51 obtains the strain quantity Dv at the strain quantity obtaining interval Tb, compares the obtained strain quantity Dv with the right previously obtained strain quantity Dv, and thus obtains the maximum value of the strain quantity Dv. The strain quantity obtaining unit 51 continues to output the strain quantity for effectiveness determination Dve until reset is performed by the control unit 6.

The control unit 6 obtains a touch coordinate output from the touch panel unit 2 at a constant interval (sampling interval) Ta. The control unit 6 compares the strain quantity for effectiveness determination Dye obtained by the strain quantity obtaining unit 51 with the strain quantity threshold value TH corresponding to the touch coordinate. If the strain quantity Dve is larger than the strain quantity threshold value TH, the control unit 6 causes the touch coordinate at the current time to be effective. The touch coordinate caused to be effective is output as an effective touch coordinate to the application processing unit 5.

The control unit 6 continuously causes the touch coordinate (particularly, two-dimensional coordinate) from output of the touch panel unit 2 to be effective until a finger being an instructing object is separated from the operation surface 40 of the touch panel unit 2 by a predetermined distance or more in a perpendicular direction. If the finger being an instructing object is separated from the operation surface 40 of the touch panel unit 2 by the predetermined distance or more in the perpendicular direction, the control unit 6 determines an operation performed on the effective touch coordinate to be released, stops output of the effective touch coordinate, and causes the strain quantity obtaining unit 51 to be reset. Then, the control unit 6 deletes the strain quantity for effectiveness determination Dye which is the maximum value of the strain quantity Dv, stored in the strain quantity obtaining unit 51.

When the electronic apparatus 50 is operated by bringing an instructing object such as a finger into contact with the touch panel unit 2 and causing a touch coordinate to be effective, large strain is detected in contact for the first time. However, then, when contact continues and an operation continues, the strain tends to decrease gradually. Particularly, this tendency appears significantly in a flicking operation and the like. In this exemplary embodiment, a touch coordinate is caused to be effective based on the strain and then is maintained to be effective until the instructing object is separated from the touch panel unit 2. Thus, it is possible to suppress incorrect detection of the strain due to very small amount of water and to prevent determination of an actual operation such as a flicking operation to be ineffective by mistake.

Figure 10:
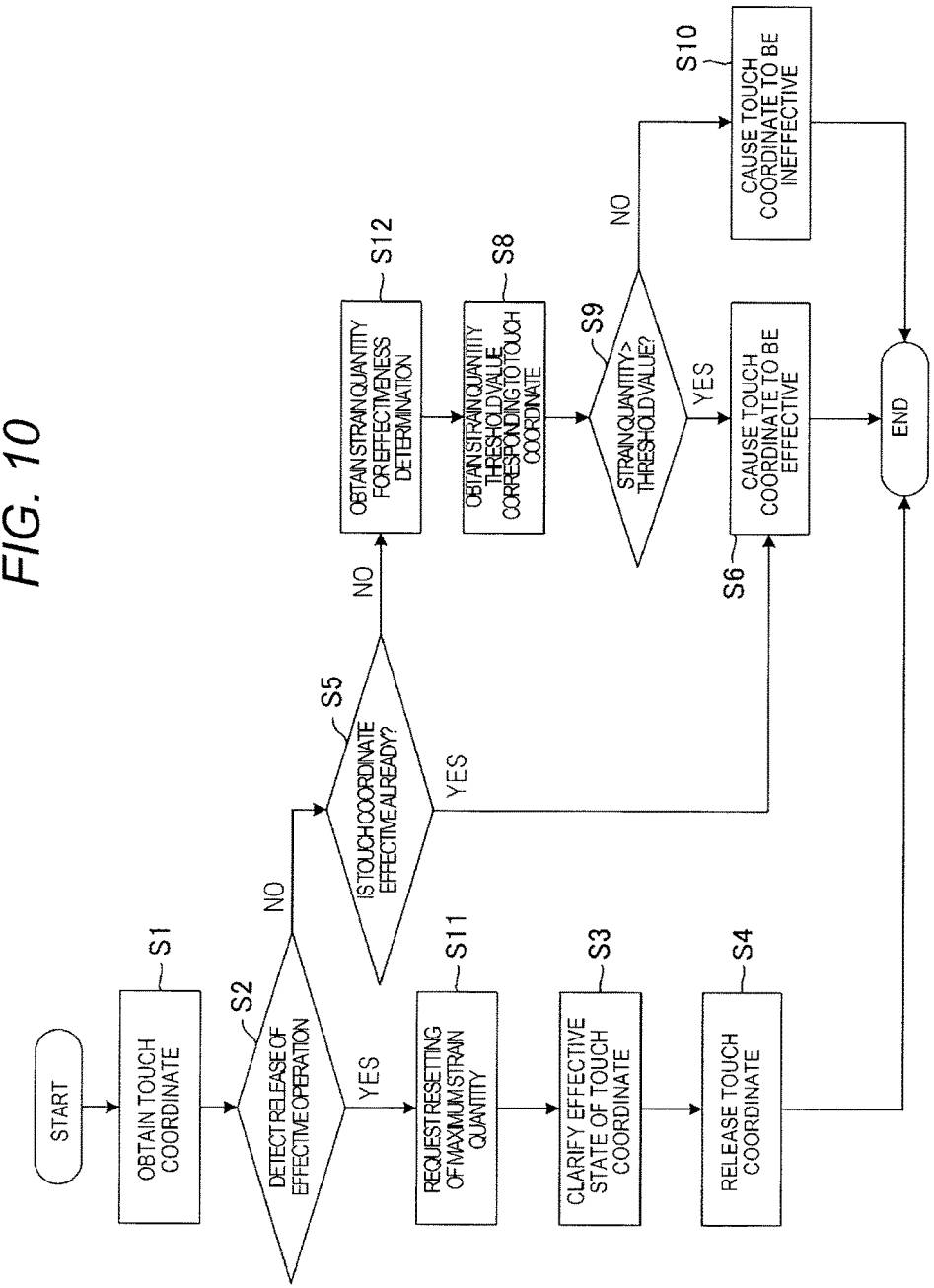
FIG. 10 is a flowchart illustrating an operation of a control unit of the electronic apparatus according to Exemplary Embodiment 2.
Figure 11:
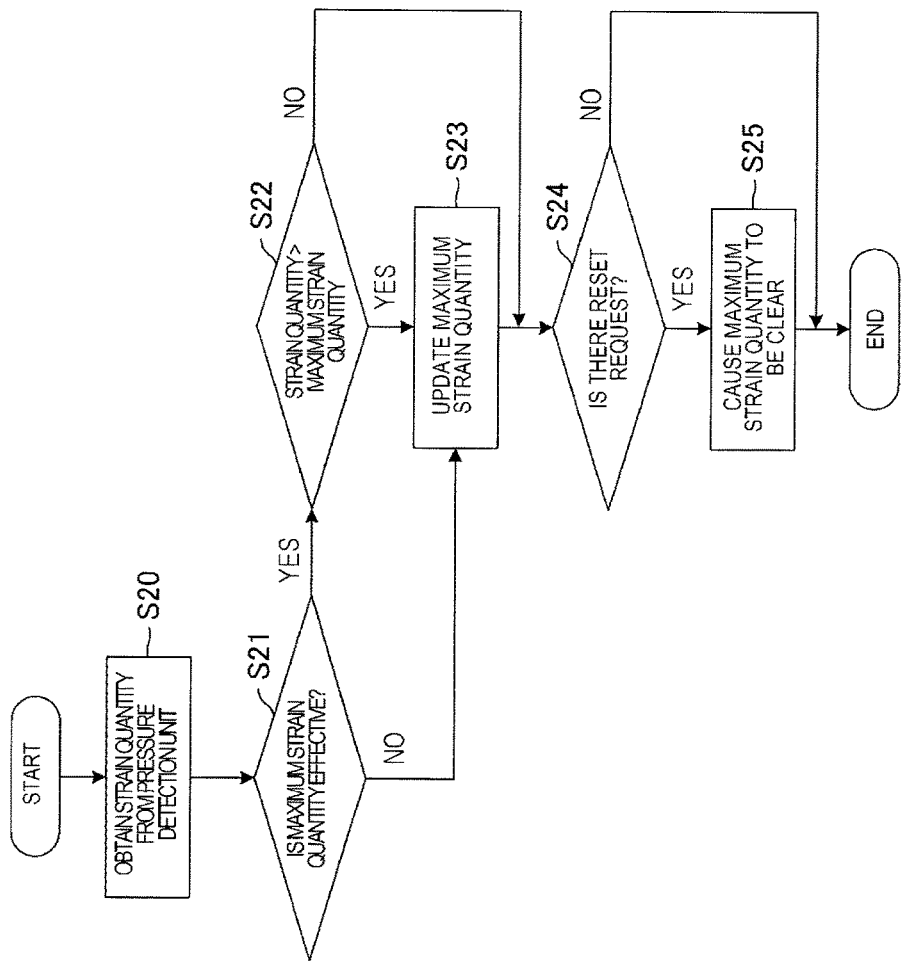
FIG. 11 is a flowchart illustrating an operation of a strain quantity obtaining unit of the electronic apparatus according to Exemplary Embodiment 2.

FIG. 10 is a flowchart illustrating an operation of the control unit 6 of the electronic apparatus 50 according to Exemplary Embodiment 2. In FIG. 11, processes common as the processes illustrated in FIG. 7 are denoted by the same reference numerals and detailed descriptions thereof will be omitted.

In FIG. 10, the control unit 6 obtains a touch coordinate output from the touch panel unit 2 (Step S1) and outputs the obtained touch coordinate to the unit for determining threshold value in operation surface 4. The control unit 6 determines whether or not release of an effective operation can be detected, based on the obtained touch coordinate after the coordinate is output to the unit for determining threshold value in operation surface 4 (Step S2). The control unit 6 outputs a request for resetting the maximum strain quantity, that is, the strain quantity for effectiveness determination Dve to the strain quantity obtaining unit 51 when it is determined that release of the effective operation can be detected (when there is determination of YES in Step S2) (Step S11). That is, deletion of the strain quantity for effectiveness determination Dve which is stored in the strain quantity obtaining unit 51 is required. An effective state of the touch coordinate is caused to be clear after the request for resetting the strain quantity for effectiveness determination Dve is output to the strain quantity obtaining unit 51 (Step S3). Then, the touch coordinate is released (Step S4) and the process is ended.

In the determination of Step S2, the control unit 6 determines whether or not the touch coordinate is already effective when it is determined that it is difficult to detect release of the effective operation (when there is determination of NO in Step S2) (Step S5). That is, the control unit 6 determines whether or not a state where a finger comes into contact with the operation surface 40 continues. In this determination, when it is determined that the touch coordinate is already effective (when there is determination of YES in Step S5), that is, when it is determined that the state where a finger comes into contact with the operation surface 40 continues, the touch coordinate is caused to be effective (Step S6) and the process is ended.

A strain quantity for effectiveness determination Dve is obtained from the strain quantity obtaining unit 51 when it is determined that the touch coordinate is not effective (when there is determination of NO in Step S5) (Step S12). Then, the control unit 6 obtains a strain quantity threshold value TH corresponding to the touch coordinate from the unit for determining threshold value in operation surface 4 (Step S8). The strain quantity for effectiveness determination Dve is obtained and a strain quantity threshold value TH corresponding to the touch coordinate is obtained, and then the obtained strain quantity Dv and strain quantity threshold value TH are compared (Step S9). When it is determined that the strain quantity for effectiveness determination Dve is larger than the strain quantity threshold value TH in this comparison (when there is determination of YES in Step S9), the touch coordinate is caused to be effective (Step S6) and the process is ended. On the other hand, when it is determined that the strain quantity for effectiveness determination Dve is equal to or less than the strain quantity threshold value TH (when there is determination of NO in Step S9), the touch coordinate is caused to be ineffective (Step S10) and the process is ended. The above processes (Steps S1 to S6 and Steps S8 to S12) are executed whenever a touch coordinate is obtained.

FIG. 11 is a flowchart illustrating an operation of the strain quantity obtaining unit 51 of the electronic apparatus 50 according to Exemplary Embodiment 2. In FIG. 11, the strain quantity obtaining unit 51 obtains a strain quantity output from the pressure detection unit 3 (Step S20). It is determined whether or not the maximum strain quantity (strain quantity for effectiveness determination Dve) is effective (Step S21). When it is determined that the maximum strain quantity is effective (when there is determination of YES in Step S21), it is determined whether or not a strain quantity obtained at the current time is larger than the maximum strain quantity (Step S22). In this determination, when it is determined that the strain quantity obtained at the current time is larger than the maximum strain quantity (when there is determination of YES in Step S22), the maximum strain quantity is updated (Step S23). That is, update of the strain quantity obtained at the current time being set as the maximum strain quantity is performed.

In the determination of Step S21, when it is determined that the maximum strain quantity is not effective (when there is determination of NO in Step S21), the maximum strain quantity is updated (Step S23). After the maximum strain quantity is updated, it is determined whether or not a reset request is received from the control unit 6 (Step S24). When it is determined that the reset request is received (when there is determination of YES in Step S24), the maximum strain quantity which is stored currently is caused to be clear (Step S25) and the process is ended. When it is determined that the reset request is not received in the determination of Step S24 (when there is determination of NO in Step S24), the process is ended with no process being performed. The above processes (Steps S20 to S25) are executed at a predetermined time interval.

With such the electronic apparatus 50 according to Exemplary Embodiment 2, since the strain quantity obtaining unit 51 that obtains a strain quantity at an interval which is faster than variation in strain to be detected and stores the maximum value of the strain quantity is included, a touch operation causing a little variation in strain quantity may be caused to be effective and thus it is possible to prevent determination of an actual operation to be ineffective by mistake. That is, when a touch coordinate is obtained at a predetermined sampling interval, if a strain quantity at a time when the touch coordinate is obtained does not exceed the strain quantity threshold value (that is, when a predetermined condition is not satisfied), the touch coordinate at that time is not caused to be effective. With this, it is possible to prevent a touch coordinate obtained by attachment of water or the like from being caused to be effective. When a strain quantity at a time when a touch coordinate is obtained exceeds the strain quantity threshold value for the sampling interval for obtaining the touch coordinate (that is, when the predetermined condition is satisfied), the touch coordinate at that time is caused to be effective. With this, it is possible to cause a two-dimensional coordinate obtained through a touch operation performed by an instructing object such as a finger to be effective. If the touch coordinate is caused to be effective once, the touch coordinate is caused to be effective continuously until the instructing object such as a finger is separated from the operation surface 40 of the touch panel unit 2 in the perpendicular direction by the predetermined distance or more. Accordingly, it is possible to prevent determination of a touch coordinate being caused to be ineffective when an operation in which a large strain quantity occurring due to a flicking operation and the like is not secured is performed.

Exemplary Embodiment 3

Figure 12B:
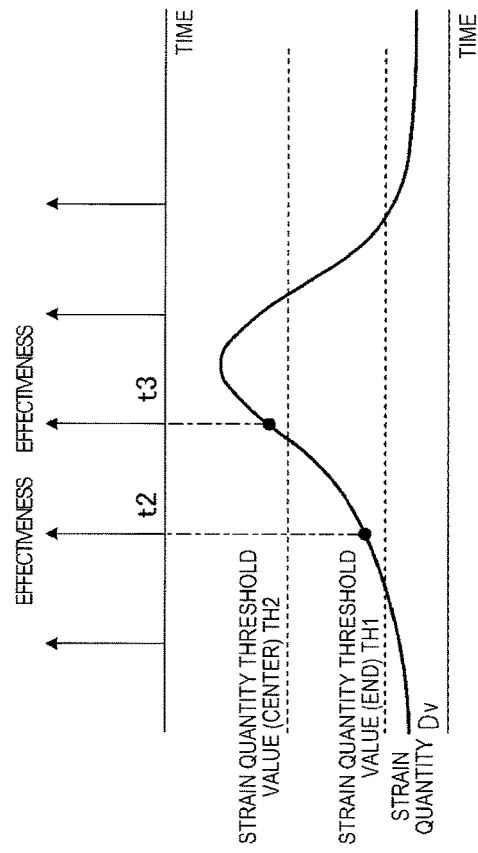
FIGS. 12A and 12B are diagrams illustrating a problem which is the assumption of an electronic apparatus according to Exemplary Embodiment 3 of the present invention.
Figure 12A:
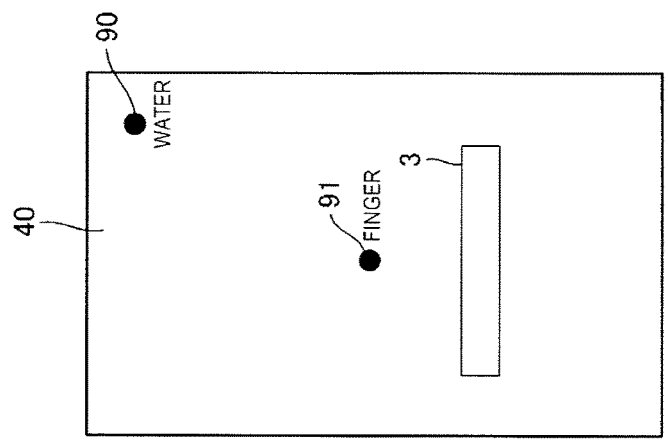

An electronic apparatus 60 according to Exemplary Embodiment 3 of the present invention includes a unit that can prevent determination of a touch coordinate obtained by a touch which is not an operation to be effective by mistake, and the touch is one of multi-touch detected by the touch panel unit 2. An example of a case where the touch panel unit 2 detects simultaneously a plurality of touch coordinates includes a case where one touch coordinate is obtained through an operation of a finger and the remaining touch coordinates are obtained by water. As illustrated in FIG. 12A, when water 90 is in the vicinity of the end of the operation surface 40 and an operation is performed in the vicinity of the center of the operation surface 40 with a finger 91, the water 90 and the finger 91 are brought onto contact with the operation surface 40 and thus touch coordinates corresponding to the water 90 and the finger 91 are output from the touch panel unit 2.

Since the finger 91 is at the center portion of the operation surface 40 and the water 90 is at the end of the operation surface 40, a strain quantity threshold value is set to be a small value which corresponds to the water. That is, as illustrated in FIG. 12B, a strain quantity threshold value TH1 for the water 90 is set to be small and a strain quantity threshold value TH2 for the finger 91 is set to be large. Since a strain quantity exceeds the strain quantity threshold value TH1 at a portion at which there is the water 90, incorrect detection due to the water 90 is caused to be effective earlier. That is, a touch coordinate obtained by the water 90 is caused to be effective at a touch coordinate obtaining time point t2. However, it is desired to cause a touch coordinate which is obtained by the finger 91 at a touch coordinate obtaining time point t3 to be effective earlier.

As countermeasures for solving this problem, the following method is considered.

A strain quantity being increasing is considered as that an operation is in the process of being performed and determination of being effective is not performed.

Determination of being effective is performed on a touch coordinate after variation in the strain quantity is determined to be stable.

Variation in the strain quantity in accordance with a touch operation is detected in a flow of increase, stagnation, and decrease and thus being increasing is considered as an operation is in the process of being performed and determination of being effective is not performed.

Proposed scheme for determining to be stable

A case where increase of the strain quantity is equal to or less than the predetermined threshold value (threshold value for determining increase of the strain quantity)

A case where a case where increase of the strain quantity is equal to or less than the predetermined threshold value (threshold value for determining increase of the strain quantity) is performed a predetermined number of times A case where it is detected that there is variation in the strain quantity or a case where decrease in the strain quantity is detected for the first time A case where no variation in the strain quantity occurs and then the strain quantity does not increase continuously a predetermined number of times or a case where no decrease in the strain quantity is detected and then the strain quantity does not increase continuously a predetermined number of times A case where the strain quantity is in a predetermined range for a predetermined time after the strain quantity exceeds the predetermined threshold value (threshold value for ignoring an electrical noise and the like)

Selection method when a plurality of coordinates exceed the threshold value simultaneously at a timing of determination select a coordinate obtained by detecting a touch which is performed later select a coordinate having a large threshold value Because of that the great strain is detected at the center portion easier than being detected at the end Plans exemplified below are included when threshold values corresponding to touch coordinates are the same as each other.

all of the touch coordinates are effective the touch coordinate obtained by performing touching later is effective the touch coordinate which is closed to the center portion is effective A case where "selection of a coordinate obtained by detecting a touch which is performed later" is performed will be described with reference to the drawings.

Figure 13:
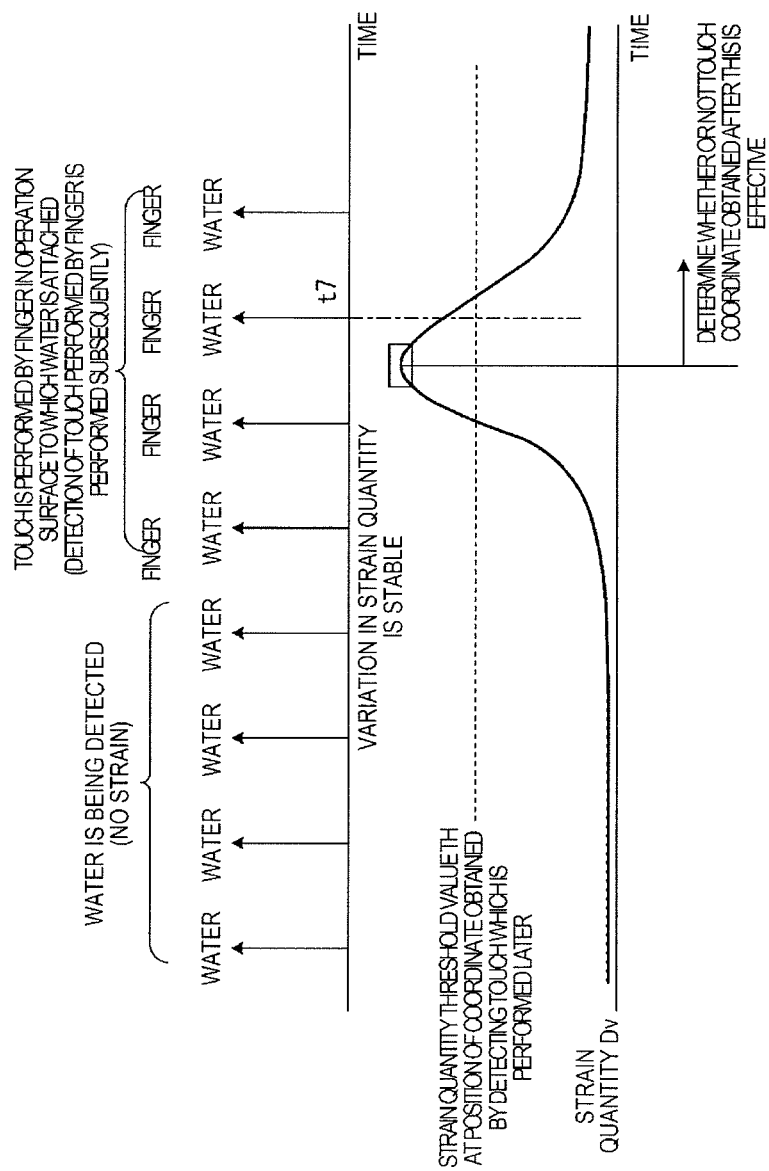
FIG. 13 is a diagram illustrating a function when the electronic apparatus according to Exemplary Embodiment 3 has the function of "selecting a coordinate obtained by detecting a touch which is performed later"

FIG. 13 is a diagram illustrating a function when the electronic apparatus 60 according to Exemplary Embodiment 3 has the function of "selecting of a coordinate obtained by detecting a touch which is performed later". This function will be described with reference to FIGS. 12A and 12B together. The example illustrated in FIG. 13 corresponds to an example in which if the water 90 is attached to the operation surface 40 before the operation surface 40 of the touch panel unit 2 is operated with the finger 91, a touch coordinate corresponding to the finger 91 which is detected subsequent to detection of the water 90 is selected. Since the water 90 itself is not recognized, it is not confirmed whether the water 90 is brought onto contact with the operation surface 40. However, in this example, it is assumed that the water 90 is brought onto contact with the operation surface 40.

The water 90 is attached to the operation surface 40 of the touch panel unit 2 and thus a touch coordinate corresponding to a position at which the water 90 is attached is output from the touch panel unit 2. The touch coordinate output from the touch panel unit 2 is input to the control unit 6 at a touch coordinate obtaining timing. A strain quantity which is detected by the pressure detection unit 3 when the water 90 is attached to the operation surface 40 is smaller than the strain quantity threshold value TH. Thus, the strain quantity does not exceed the strain quantity threshold value TH. As described above, the strain quantity threshold value TH is set to a value larger than the strain quantity detected when the water 90 is attached to the operation surface 40 such that the touch coordinate obtained by attachment of the water 90 is not caused to be effective.

If the finger 91 touches the operation surface 40 after the water 90 is attached to the operation surface 40 of the touch panel unit 2, a touch coordinate corresponding to a position at which the finger 91 comes onto contact with the operation surface 40 is output from the touch panel unit 2. A strain quantity Dv output from the pressure detection unit 3 increases gradually and when the strain quantity Dv reaches the maximum value, variation in the strain quantity Dv becomes stable. It is determined whether or not the touch coordinate is effective, from a time when the variation in the strain quantity Dv is stable. The strain quantity Dv is compared with the strain quantity threshold value (strain quantity threshold value corresponding to the coordinate of a position at which a touch occurs by a finger) TH at a touch coordinate obtaining timing t7 after the variation in the strain quantity Dv is stable. At this time, if the strain quantity Dv exceeds the strain quantity threshold value TH, the touch coordinate corresponding to a position at which the finger 91 comes onto contact with the operation surface 40 becomes effective. In this manner, if the variation in the strain quantity Dv is stable and exceeds the strain quantity threshold value TH, a touch coordinate at that time becomes effective.

Figure 14:
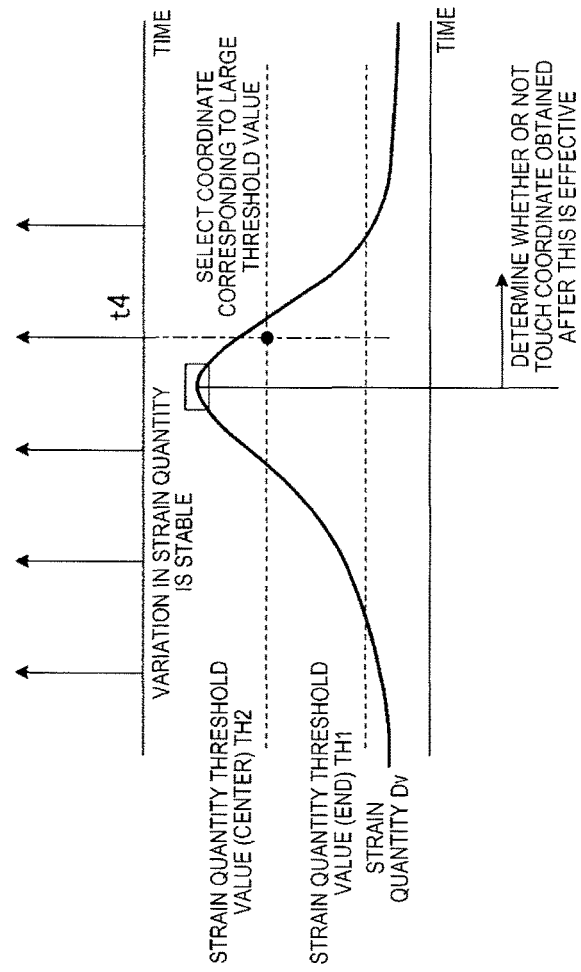
FIG. 14 is a diagram illustrating a function when the electronic apparatus according to Exemplary Embodiment 3 has the function of "selecting a coordinate corresponding to a large threshold value"

FIG. 14 is a diagram illustrating a function when the electronic apparatus 60 according to Exemplary Embodiment 3 has the function of "selecting a coordinate corresponding to a large threshold value". In FIG. 14, the strain quantity Dv increases gradually and when the strain quantity Dv reaches the maximum value, variation in the strain quantity Dv becomes stable. It is determined whether or not touch coordinates are effective, from a time when the variation in the strain quantity Dv is stable. The touch coordinate corresponding to a large one of strain quantity threshold values TH1 and TH2 is selected at a touch coordinate obtaining timing t4 after the variation in the strain quantity Dv is stable. In this case, the strain quantity threshold value TH2 corresponding to the position at which a touch occurs by the finger 91 is larger than the strain quantity threshold value TH1 corresponding to the position at which the water 90 is attached and thus the touch coordinate corresponding to the position at which the finger 91 comes into contact becomes effective. In this manner, the variation in the strain quantity Dv is stable and then the touch coordinate corresponding to the large strain quantity threshold value is selected and the touch coordinate at that time becomes effective.

Figure 15:
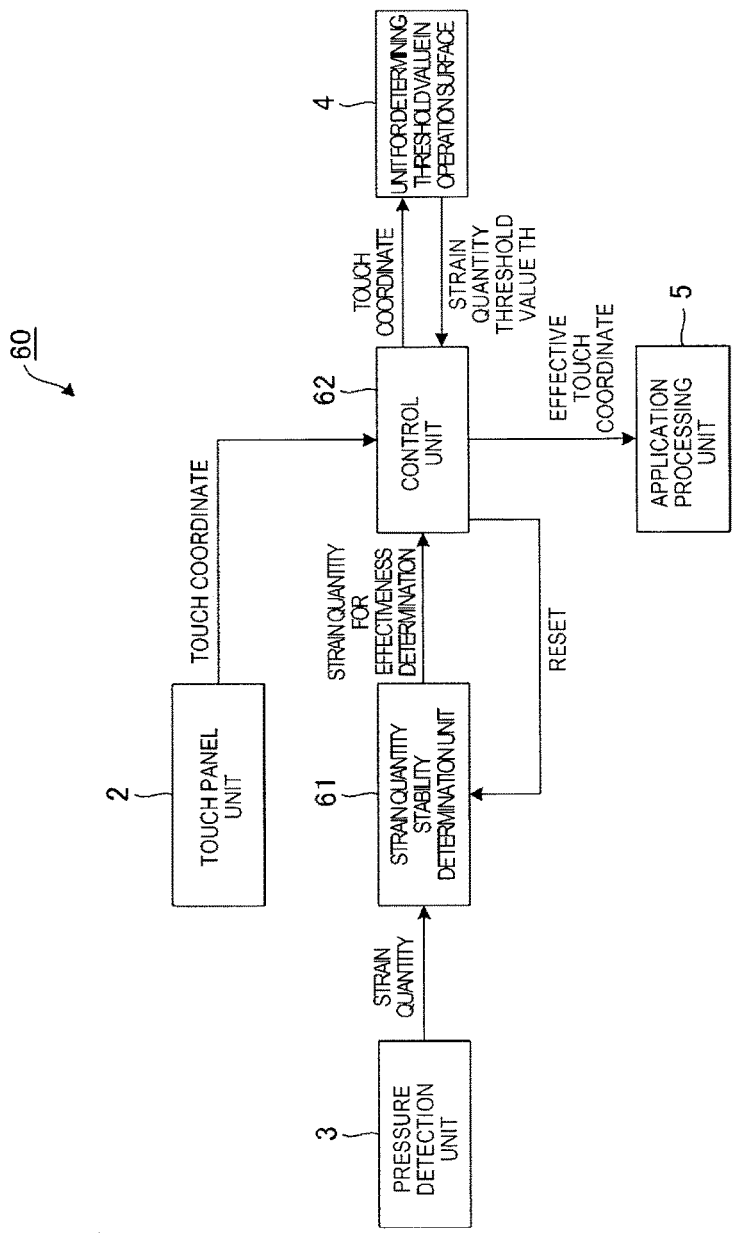
FIG. 15 is a block diagram illustrating a schematic configuration of the electronic apparatus according to Exemplary Embodiment 3.

FIG. 15 is a block diagram illustrating a schematic configuration of the electronic apparatus 60 according to Exemplary Embodiment 3. In FIG. 15, components common as the above described components in FIG. 1 are denoted by the same reference numerals and descriptions thereof will be omitted. The electronic apparatus 60 according to Exemplary Embodiment 3 may prevent determination of a touch coordinate which is not obtained by an operation to be effective by mistake also when the touch panel unit 2 detects multi-touch at portions on the operation surface 40 of the touch panel unit 2, which have different strain quantity threshold values from each other, as descried above. The electronic apparatus 60 includes a strain quantity stability determination unit 61 as a unit for allowing determination by mistake to be prevented.

The strain quantity stability determination unit 61 outputs the strain quantity as the strain quantity for effectiveness determination to the control unit 62 after variation in the strain quantity output from the pressure detection unit 3 is stable. The unit for determining threshold value in operation surface 4 outputs strain quantity threshold values corresponding to a plurality of touch coordinates to the control unit 62. For example, the unit for determining threshold value in operation surface 4 outputs a strain quantity threshold value corresponding to a touch coordinate obtained by the water 90 and a strain quantity threshold value corresponding to a touch coordinate obtained by the finger 91 to the control unit 62. When the control unit 62 has the function of "selecting of a coordinate obtained by detecting a touch which is performed later", the control unit 62 selects the strain quantity threshold value corresponding to the touch coordinate obtained by the finger 91. Then, the control unit 62 compares the selected strain quantity threshold value with the strain quantity for effectiveness determination obtained by the strain quantity stability determination unit 61. When the strain quantity for effectiveness determination is larger than the selected strain quantity threshold value, the control unit 62 causes the touch coordinate obtained by the finger 91 to be effective and outputs the touch coordinate as an effective touch coordinate to the application processing unit 5.

When the control unit 62 has the function of "selecting a coordinate corresponding to a large threshold value", the control unit 62 selects the strain quantity threshold value corresponding to the touch coordinate obtained by the finger 91. Then, the control unit 62 compares the selected strain quantity threshold value with the strain quantity for effectiveness determination obtained by the strain quantity stability determination unit 61. When the strain quantity for effectiveness determination is larger than the selected strain quantity threshold value, the control unit 62 causes the touch coordinate obtained by the finger 91 to be effective and outputs the touch coordinate as an effective touch coordinate to the application processing unit 5. After then, touch coordinates becomes effective continuously until an operation is not performed (that is, until a finger is released from the operation surface 40 of the touch panel unit 2). If an operation is not performed (that is, if a finger is released from the operation surface 40 of the touch panel unit 2), the control unit 62 controls the strain quantity stability determination unit 61 to be reset and stops outputting the effective touch coordinate.

Figure 16:
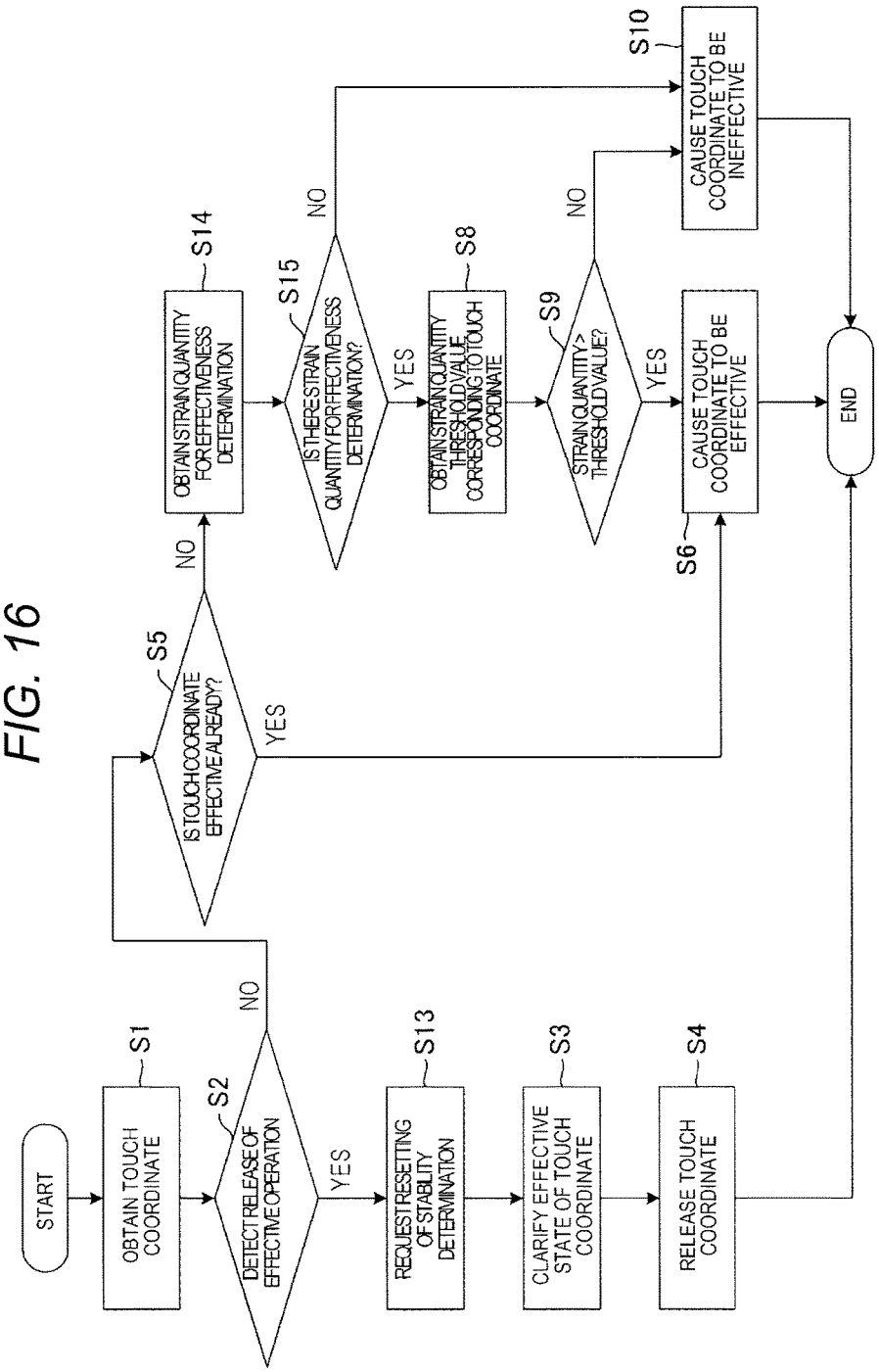
FIG. 16 is a flowchart illustrating an operation of a control unit of the electronic apparatus according to Exemplary Embodiment 3.

FIG. 16 is a flowchart illustrating an operation of the control unit 62 of the electronic apparatus 60 according to Exemplary Embodiment 3. In FIG. 16, processes common as the processes illustrated in FIG. 7 are denoted by the same reference numerals and detailed descriptions thereof will be omitted.

In FIG. 16, the control unit 62 obtains a touch coordinate output from the touch panel unit 2 (Step S1) and outputs the obtained touch coordinate to the unit for determining threshold value in operation surface 4. The control unit 6 determines whether or not release of an effective operation can be detected, based on the obtained touch coordinate after the coordinate is output to the unit for determining threshold value in operation surface 4 (Step S2). The control unit 6 outputs a request for resetting stability determination to the strain quantity stability determination unit 61 when it is determined that release of the effective operation can be detected (when there is determination of YES in Step S2) (Step S13). The control unit 6 causes an effective state of the touch coordinate to be clear after the request for resetting stability determination is output to the strain quantity stability determination unit 61 (Step S3). Then, the touch coordinate is released (Step S4) and the process is ended.

In the determination of Step S2, the control unit 6 determines whether or not the touch coordinate is already effective when it is determined that it is difficult to detect release of the effective operation (when there is determination of NO in Step S2) (Step S5). In this determination, when it is determined that the touch coordinate is already effective (when there is determination of YES in Step S5), the touch coordinate is caused to be effective (Step S6) and the process is ended. When a plurality of touch coordinates exceed the threshold value simultaneously in Step S6, selection is performed. For example, the coordinate obtained by detecting a touch which is performed later is selected or the coordinate corresponding to a large strain quantity threshold value is selected.

The control unit 6 obtains a strain correction quantity for effectiveness determination output from the strain quantity stability determination unit 61 when it is determined that the touch coordinate is not effective (when there is determination of NO in Step S5) (Step S14). The control unit 6 determines whether or not there is the strain quantity for effectiveness determination (Step S15). The control unit 6 obtains the strain quantity threshold value corresponding to the touch coordinate from the unit for determining threshold value in operation surface 4 when it is determined that there is the strain quantity for effectiveness determination (when there is determination of YES in Step S15), that is, when it is determined that the variation in the strain quantity is stable (Step S8).

The control unit 6 obtains the strain quantity for effectiveness determination and obtains the strain quantity threshold value corresponding to the touch coordinate and then compares the obtained strain quantity for effectiveness determination with the obtained strain quantity threshold value (Step S9). When it is determined that the strain quantity for effectiveness determination is larger than the strain quantity threshold value (when there is determination of YES in Step S9), the control unit 6 causes the touch coordinate to be effective (Step S6) and the process is ended. On the other hand, when it is determined that the strain quantity for effectiveness determination is equal to or less than the strain quantity threshold value (when there is determination of NO in Step S9), the control unit 6 causes the touch coordinate to be ineffective (Step S10) and the process is ended.

In the determination of Step S15, when it is determined that there is no strain quantity for effectiveness determination (when there is determination of NO in Step S15), that is, when it is determined that the strain quantity is increasing or that the variation in the strain quantity is unstable, the control unit 6 causes the touch coordinate to be ineffective (Step S10) and the process is ended. The above processes (Steps S1 to S6, Steps S8 to S10, and Steps S13 to S15) are executed whenever a touch coordinate is obtained.

Figure 17:
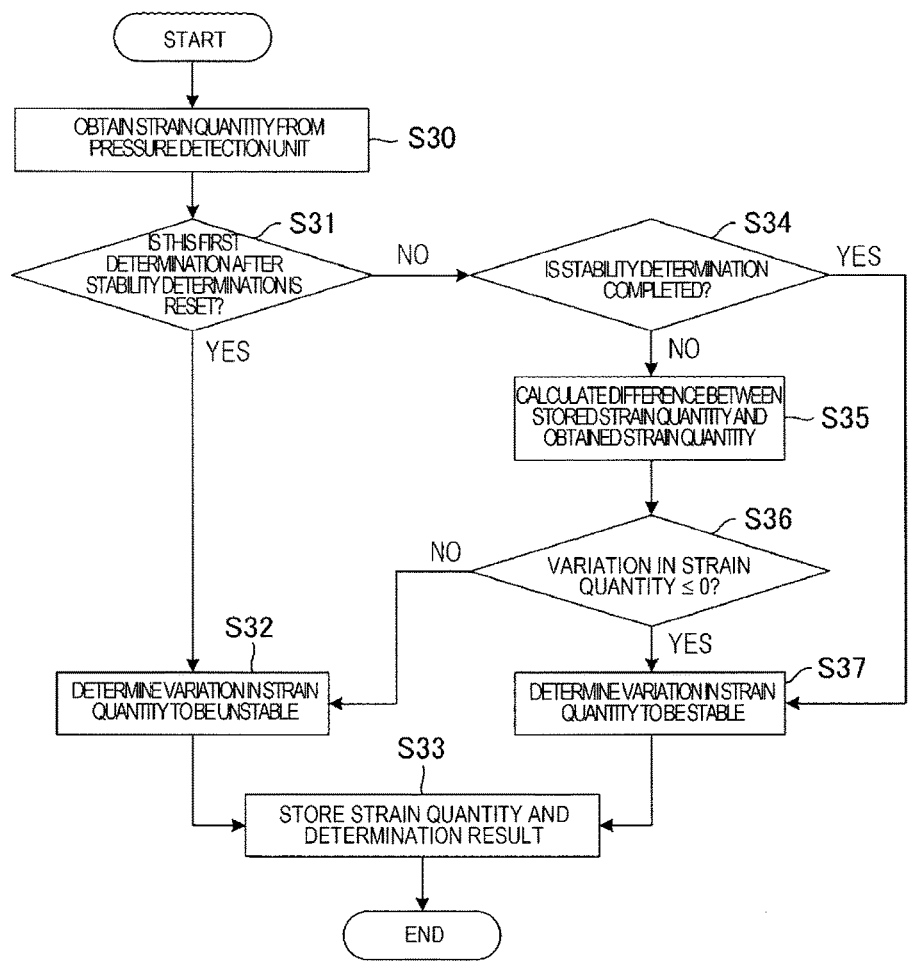
FIG. 17 is a flowchart illustrating an operation of a strain quantity stability determination unit of the electronic apparatus according to Exemplary Embodiment 3.

FIG. 17 is a flowchart illustrating an operation of the strain quantity stability determination unit 61 of the electronic apparatus 60 according to Exemplary Embodiment 3. In FIG. 17, the strain quantity stability determination unit 61 determines a case to be stable and the case includes a case where the strain quantity varies no longer or a case where reduction of the variation in the strain quantity is detected for the first time. The strain quantity stability determination unit 61 obtains a strain quantity output from the pressure detection unit 3 (Step S30). The strain quantity stability determination unit 61 determines whether or not stability determination is being performed first time after the stability determination is reset (Step S31). When it is determined that stability determination is being performed first time after the stability determination is reset (when there is determination of YES in Step S31), the strain quantity stability determination unit 61 determines the strain quantity to be unstable (Step S32). This is because this stability determination is performed for the first time and thus the strain quantity is unstable obviously. The strain quantity stability determination unit 61 stores the current strain quantity and the determination result (Step S33) and the process is ended.

In the determination of Step S31, when it is determined that stability determination is not being performed first time after the stability determination is reset (when there is determination of NO in Step S31), the strain quantity stability determination unit 61 determines whether or not stability determination is completed (Step S34). When it is determined that stability determination is completed (when there is determination of YES in Step S34), the strain quantity stability determination unit 61 determines the strain quantity to be stable (Step S37) and stores the current strain quantity and the determination result (Step S33), and the process is ended. In the determination of Step S34, when it is determined that stability determination is not completed (when there is determination of NO in Step S34), the strain quantity stability determination unit 61 calculates a difference between the stored strain quantity and the current strain quantity (Step S35).

After the difference is calculated, the strain quantity stability determination unit 61 determines whether or not the variation in the strain quantity is equivalent to a value equal to or less than 0 (zero) (Step S36). That is, the strain quantity stability determination unit 61 determines whether there is no variation in the strain quantity or whether or not the strain quantity varies so as to be reduced. When it is determined that the variation in the strain quantity is equivalent to a value more than 0 (zero) (when there is determination of NO in Step S36), that is, when it is determined that the strain quantity varies, the strain quantity stability determination unit 61 proceeds to Step S32 and determines the strain quantity to be unstable. On the other hand, when it is determined that the variation in the strain quantity is equivalent to a value equal to or less than 0 (zero) (when there is determination of YES in Step S36), the strain quantity stability determination unit 61 determines the strain quantity to be stable (Step S37) and outputs the strain quantity as the strain quantity for effectiveness determination to the control unit 62. Then, the strain quantity stability determination unit 61 stores the current strain quantity and the determination result in Step S33 and the process is ended.

With such the electronic apparatus 60 according to Exemplary Embodiment 3, it is possible to prevent determination of a touch coordinate which is not obtained by an operation to be effective by mistake when the touch panel unit 2 detects multi-touch at the portions having different strain quantity threshold values from each other.

Exemplary Embodiment 4

Figure 18:
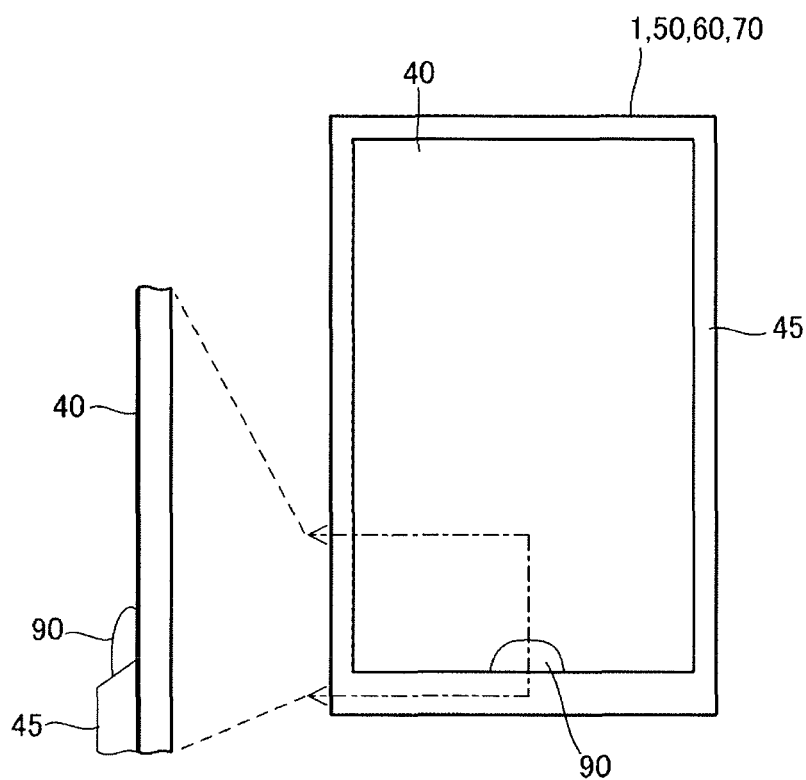
FIG. 18 is a view of the appearance on a front surface side of an electronic apparatus according to Exemplary Embodiment 4 of the present invention and an enlarged view of a cross-section of a part of the appearance.

FIG. 18 is a view of an appearance on a front surface side of an electronic apparatus 70 according to Exemplary Embodiment 4 of the present invention and an enlarged view of a cross-section of a part of the appearance. In other electronic apparatuses in addition to the electronic apparatus 70 according to Exemplary Embodiment 4, if a level difference is in the vicinity of a boundary between the inside and the outside of an operation surface due to a structure of a casing, water is likely to be collected. Thus, water may be detected normally when the water is attached to the operation surface 40. In the electronic apparatus 70 according to Exemplary Embodiment 4, the structure of the casing remains as it is and incorrect detection is not performed when the water 90 is collected in the vicinity of a boundary between a bezel 45 and the operation surface 40.

In the electronic apparatus 70 according to Exemplary Embodiment 4, a strain quantity threshold value at only an end portion of the operation surface 40 is set to a value for no response in a normal operation. FIG. 19 is a diagram illustrating an example of a strain quantity threshold value TH in the electronic apparatus 70 according to Exemplary Embodiment 4. As illustrated in FIG. 19, the strain quantity threshold value TH is set to a large value ("500") at only a peripheral portion. In this manner, a strain quantity does not exceed the strain threshold value in an operation performed in the vicinity of an installation position of the pressure detection unit 3 which is able to detect a large strain quantity and thus the water 90 which is collected at the end is not determined to be an effective operation.

If an area of a portion corresponding to the end is wide, it is difficult to perform an operation at the end. Accordingly, the following methods may be applied.

make an area obtained by performing division small.
divide an area at only the end into small areas.

If a portion at which incorrect detection is likely to be performed is limited to a lower end, a threshold value corresponding to the vicinity of the lower end may be changed.

An area at only the end may be divided into small areas in order to increase the number of operational areas without greatly increasing the number of subdivisions.

A threshold value corresponding to only the lower end which is dynamically changed in accordance with a direction of a terminal may be changed.

A program describing the processes which are illustrated in the flowcharts (FIG. 7, FIG. 10, FIG. 11, FIG. 16, and FIG. 17) of Exemplary Embodiments 1 to 3 is stored in a ROM of each of the control units 6 and 62. However, the program may be stored in a storage medium such as a magnetic disk, an optical disk, a magneto-optical disk, a flash memory and be distributed or may be stored in a server (not illustrated) over a network such as the Internet and be downloaded by using an electric telecommunication line.

Each of the electronic apparatuses 1, 50, 60, and 70 according to Exemplary Embodiments 1 to 4 is applied to a portable wireless device called as a smartphone. However, it is not limited to the portable wireless device and may be applied to home appliances such as a microwave oven, a control panel of a navigation system and the like in a car or the like.

In the present invention, an effect that when the sampling interval for obtaining a two-dimensional coordinate from the touch panel is longer than a variation time of a strain quantity detected by the strain sensor, it is also possible to accurately obtain variation in the strain quantity is obtained. The present invention may be applied to an electronic apparatus using an electrostatic capacitive touch panel, such as a smartphone.

What is claimed is:

1. An electronics apparatus, comprising:
a display configured to display content;
a touch panel being electrostatic capacitive, overlapping the display, and configured to determine a two-dimensional coordinate corresponding to an object which has conductivity;
a transparent member overlapping the touch panel; and
a sensor configured to detect strain on the transparent member,
wherein the touch panel is further configured to detect a variation of charge caused by the object on the touch panel,
the sensor is further configured to detect a variation in strain quantity of the strain on the transparent member,
when the sensor detects the strain on the transparent member and the variation in the strain quantity is increasing, a quantity of the strain is determined after the variation in the strain quantity becomes stable and not determined while the variation in the strain quantity is increasing, when the touch panel detects the variation of the charge, and the quantity of the strain on the transparent member is larger than a predetermined threshold value, the two-dimensional coordinate determined by the touch panel is effective, after the two-dimensional coordinate is effective, the two-dimensional coordinate is continuously effective until the object is away from the transparent member by at least a first distance, and when the touch panel detects the variation of the charge, and the quantity of the strain on the transparent member is not larger than the predetermined threshold value, the two-dimensional coordinate determined by the touch panel is ineffective.

2. The electronics apparatus according to claim 1, wherein the predetermined threshold value is set from among a plurality of predetermined threshold values, the predetermined threshold value being set based on the two-dimensional coordinate determined by the touch panel.

3. The electronics apparatus according to claim 1, wherein when the two-dimensional coordinate determined by the touch panel, when the touch panel detects the variation of the charge, is ineffective, and when the touch panel detects a second variation of the charge caused by a second object, and a second quantity of the strain on the transparent member is larger than a second predetermined threshold value, a second two-dimensional coordinate determined by the touch panel corresponding to the second object is effective.

4. The electronics apparatus according to claim 3, wherein when the touch panel detects the variation of the charge and the second variation of the charge caused by the second object on the touch panel, the predetermined threshold value and the second predetermined threshold value are set based on the two-dimensional coordinate corresponding to the object and the second two-dimensional coordinate corresponding to the second object, respectively.

5. The electronics apparatus according to claim 1, wherein the transparent member is integrally formed with the touch panel.

6. The electronics apparatus according to claim 1, wherein the sensor comprises a strain sensor.

7. The electronics apparatus according to claim 6, wherein the strain sensor comprises a piezo-electric film.

8. The electronics apparatus according to claim 6, wherein
the display has a first surface and a second surface opposing the first surface,
the content is displayed on the first surface, and
the strain sensor is disposed on the second surface of the display.

9. The electronics apparatus according to claim 8, wherein the strain sensor is configured to detect the strain of the transparent member due to a bending.

10. The electronics apparatus according to claim 1, wherein the touch panel is located between the transparent member and the display.

11. The electronic apparatus according to claim 1, wherein the object is a finger of a user.

12. The electronic apparatus according to claim 1, wherein
the touch panel is configured to detect the variation of the charge caused by the object when the object contacts the transparent member and when a distance between the transparent member and the object is more than zero and less than the first distance.

13. The electronic apparatus according to claim 1, wherein when the sensor detects the variation in the strain quantity is increasing, the electronic apparatus determines an operation is in a process of being performed and determination of being effective is not performed.

* * * * *